United States Patent
Zhao et al.

(10) Patent No.: US 9,185,730 B2
(45) Date of Patent: Nov. 10, 2015

(54) METHODS AND APPARATUS FOR ENABLING FALLBACK TO A SECOND DATA SERVICE BASED ON THE PRESENCE OF FALLBACK CONDITIONS ASSOCIATED WITH ESTABLISHMENT OF A DATA CONTEXT WITH A FIRST DATA SERVICE

(75) Inventors: Suli Zhao, San Diego, CA (US); Srinivasan Balasubramanian, San Diego, CA (US); Ajith Tom Payyappilly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 13/488,298

(22) Filed: Jun. 4, 2012

(65) Prior Publication Data

US 2012/0314562 A1 Dec. 13, 2012

Related U.S. Application Data

(60) Provisional application No. 61/495,281, filed on Jun. 9, 2011.

(51) Int. Cl.
*H04W 76/02* (2009.01)
*H04W 88/06* (2009.01)
*H04W 24/08* (2009.01)

(52) U.S. Cl.
CPC .............. *H04W 76/02* (2013.01); *H04W 24/08* (2013.01); *H04W 88/06* (2013.01)

(58) Field of Classification Search
CPC .................................................... H04W 76/02
USPC ......... 370/216, 328, 329, 331, 338, 341, 348, 370/312; 455/63.1, 422.1, 434, 436, 453
See application file for complete search history.

(56) References Cited

U.S. PATENT DOCUMENTS

2003/0061503 A1 3/2003 Katz et al.
2005/0192022 A1* 9/2005 Minnick et al. ............... 455/453

(Continued)

FOREIGN PATENT DOCUMENTS

JP 2006505158 A 2/2006
WO 2004040931 A2 5/2004

OTHER PUBLICATIONS

Anonymous: "3GPP TS 23.272 V10.3.1; Technical Specification Group Services and System Aspects; Circuit Switched Fallback in Evolved Packet System; Stage 2 (Release 10)", 3GPP Standard 3rd Generation Partnership Project (3GPP), Apr. 1, 2011, pp. 1-78, XP002682845, Sophia Antipolis Cedex, France; Retrieved from the Internet: URL : http://www.3gpp.org/ftp/Specs/archive/23_Series/23.272/23272-a31.zip.

(Continued)

*Primary Examiner* — Hassan Kizou
*Assistant Examiner* — Toan Nguyen
(74) *Attorney, Agent, or Firm* — Arent Fox LLP

(57) ABSTRACT

Aspects disclosed herein relate to enabling fallback to a second data service based on whether one or more fallback conditions are present before or during establishing a data context with a first data service. In one example, a UE may be configured to determine whether one or more fallback conditions are present before or during establishing a data session with a first data service. The UE may be further configured to prohibit further attempts to establish a data context to access the first data service based on the determination of the presence of at least one of the one or more fallback conditions. Some aspects disclosed herein relate to enabling fallback to a HRPD data service based on whether one or more fallback conditions are present before or during establishing a data context with an eHRPD data service.

54 Claims, 15 Drawing Sheets

(56) References Cited

U.S. PATENT DOCUMENTS

| | | |
|---|---|---|
| 2010/0177629 A1 | 7/2010 | Payyappilly et al. |
| 2010/0197230 A1* | 8/2010 | Charles et al. ............... 455/63.1 |
| 2011/0076982 A1 | 3/2011 | Li et al. |
| 2011/0149725 A1 | 6/2011 | Zhao et al. |
| 2011/0306344 A1* | 12/2011 | Chen ............................. 455/436 |
| 2012/0003958 A1 | 1/2012 | Hossain et al. |
| 2012/0034910 A1* | 2/2012 | Fang et al. ................. 455/422.1 |
| 2012/0170503 A1* | 7/2012 | Kelley et al. .................. 370/312 |
| 2012/0214483 A1* | 8/2012 | Tong et al. .................... 455/434 |

OTHER PUBLICATIONS

International Search Report and Written Opinion—PCT/US2012/040943—ISA/EPO—Oct. 5, 2012.

Translation of Japanese Office Action for Japanese Application No. 2014-514562 dated Mar. 24, 2015, 6 pages.

* cited by examiner

METHODS AND APPARATUS FOR ENABLING FALLBACK TO A SECOND DATA SERVICE BASED ON THE PRESENCE OF FALLBACK CONDITIONS ASSOCIATED WITH ESTABLISHMENT OF A DATA CONTEXT WITH A FIRST DATA SERVICE

CLAIM OF PRIORITY UNDER 35 U.S.C. §119

The present application for patent claims priority to Provisional Application No. 61/495,281 entitled "METHODS AND APPARATUS FOR ENABLING FALLBACK TO HRPD UPON FIRST SYSTEM AUTHENTICATION FAILURE" filed Jun. 9, 2011, and assigned to the assignee hereof and hereby expressly incorporated by reference herein.

FIELD OF THE INVENTION

The present disclosure relates generally to communication systems, and more particularly, to a user equipment (UE) based process to enable fallback to a second data service (e.g., high rate packet data (HRPD) data service) based on whether one or more fallback conditions are present before or during establishing a data context with a first data service (e.g., an evolved high rate packet data (eHRPD) data service).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to related aspects, a method to enable fallback to a second data service (e.g., an HRPD data service) based on whether one or more fallback conditions are present before or during establishing a data context with a first data service (e.g., an eHRPD data service). The method can include determining whether one or more fallback conditions are present before or during establishing a data session with a first data service. Further, the method can include prohibiting further attempts to establish a data context to access the first data service based on the determination of the presence of at least one of the one or more fallback conditions.

Another aspect relates to a communications apparatus. The communications apparatus can include means for determining whether one or more fallback conditions are present before or during establishing a data session with a first data service. The communications apparatus can also include means for prohibiting further attempts to establish a data context to access the first data service based on the determination of the presence of at least one of the one or more fallback conditions.

Another aspect relates to a communications apparatus. The apparatus can include a data service access module configured to determine whether one or more fallback conditions are present before or during establishing a data session with a first data service. The data service access module may be further configured to prohibit further attempts to establish a data context to access the first data service based on the determination of the presence of at least one of the one or more fallback conditions.

Another aspect relates to a computer program product, which can have a computer-readable medium comprising code for determining whether one or more fallback conditions are present before or during establishing a data session with a first data service. The computer-readable medium can also include code for prohibiting further attempts to establish a data context to access the first data service based on the determination of the presence of at least one of the one or more fallback conditions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
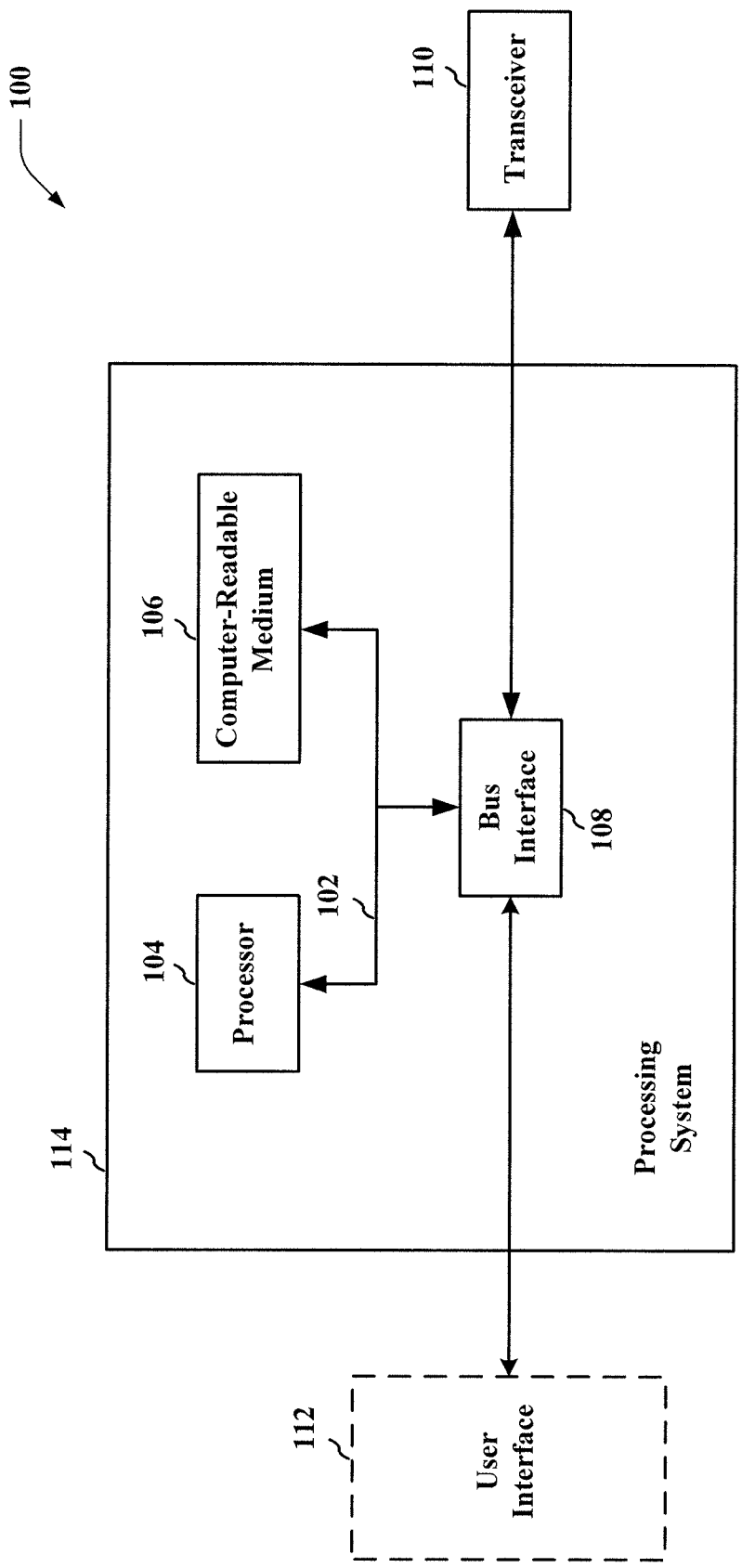
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
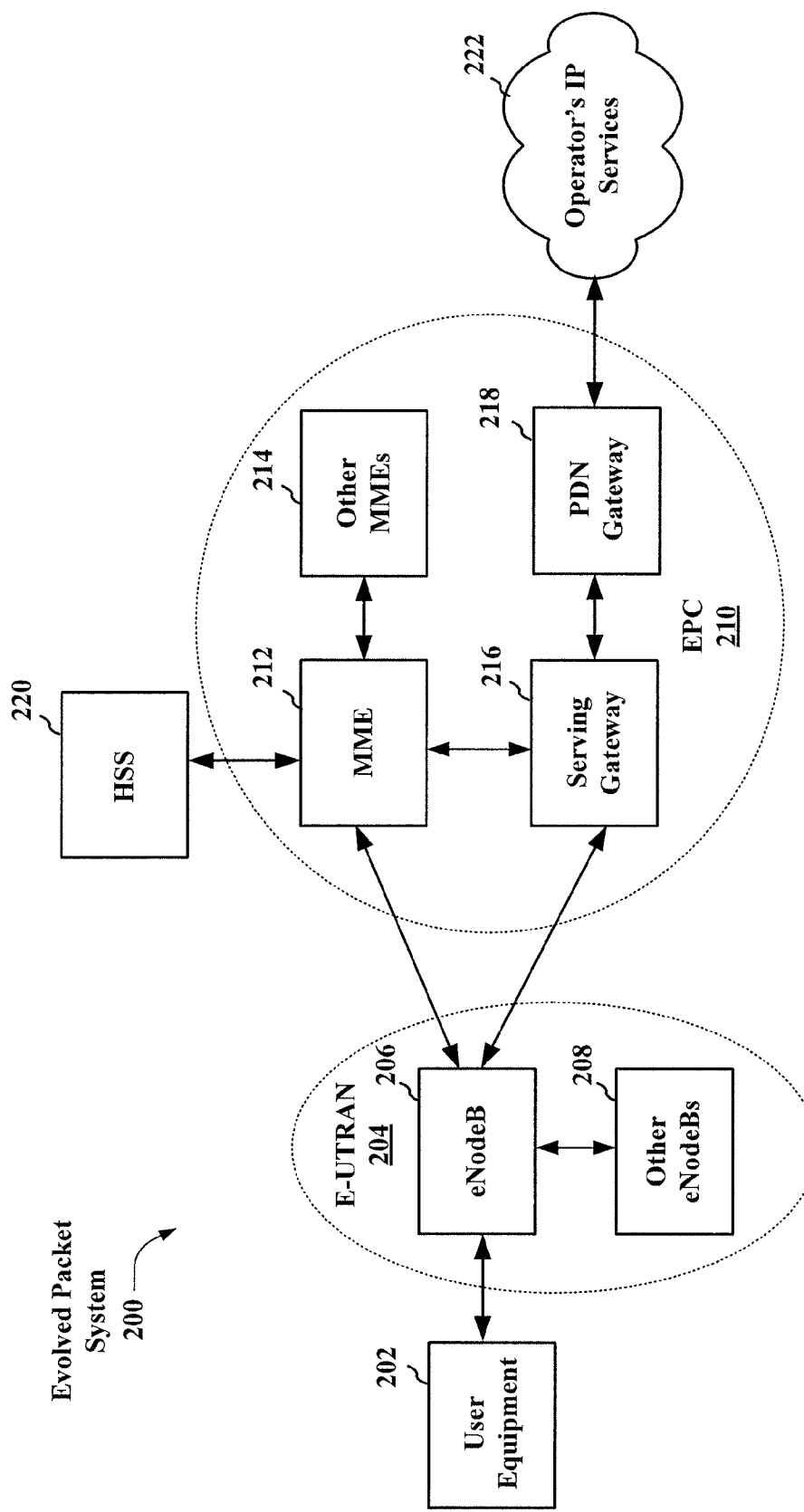
FIG. 2 is a diagram illustrating an example of a network architecture.

FIG. 2 is a diagram illustrating an LTE network architecture 200 employing various apparatuses 100 (See FIG. 1). The LTE network architecture 200 may be referred to as an Evolved Packet System (EPS) 200. The EPS 200 may include one or more user equipment (UE) 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 206 and other eNBs 208. The eNB 206 provides user and control plane protocol terminations toward the UE 202. The eNB 206 may be connected to the other eNBs 208 via an X2 interface (i.e., backhaul). The eNB 206 may also be referred to by those skilled in the art as a base station, a base transceiver station, a radio base station, a radio transceiver, a transceiver function, a basic service set (BSS), an extended service set (ESS), or some other suitable terminology. The eNB 206 provides an access point to the EPC 210 for a UE 202. Examples of UEs 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 include the Internet, the Intranet, an IP Multimedia Subsystem (IMS), and a PS Streaming Service (PSS).

Figure 3:
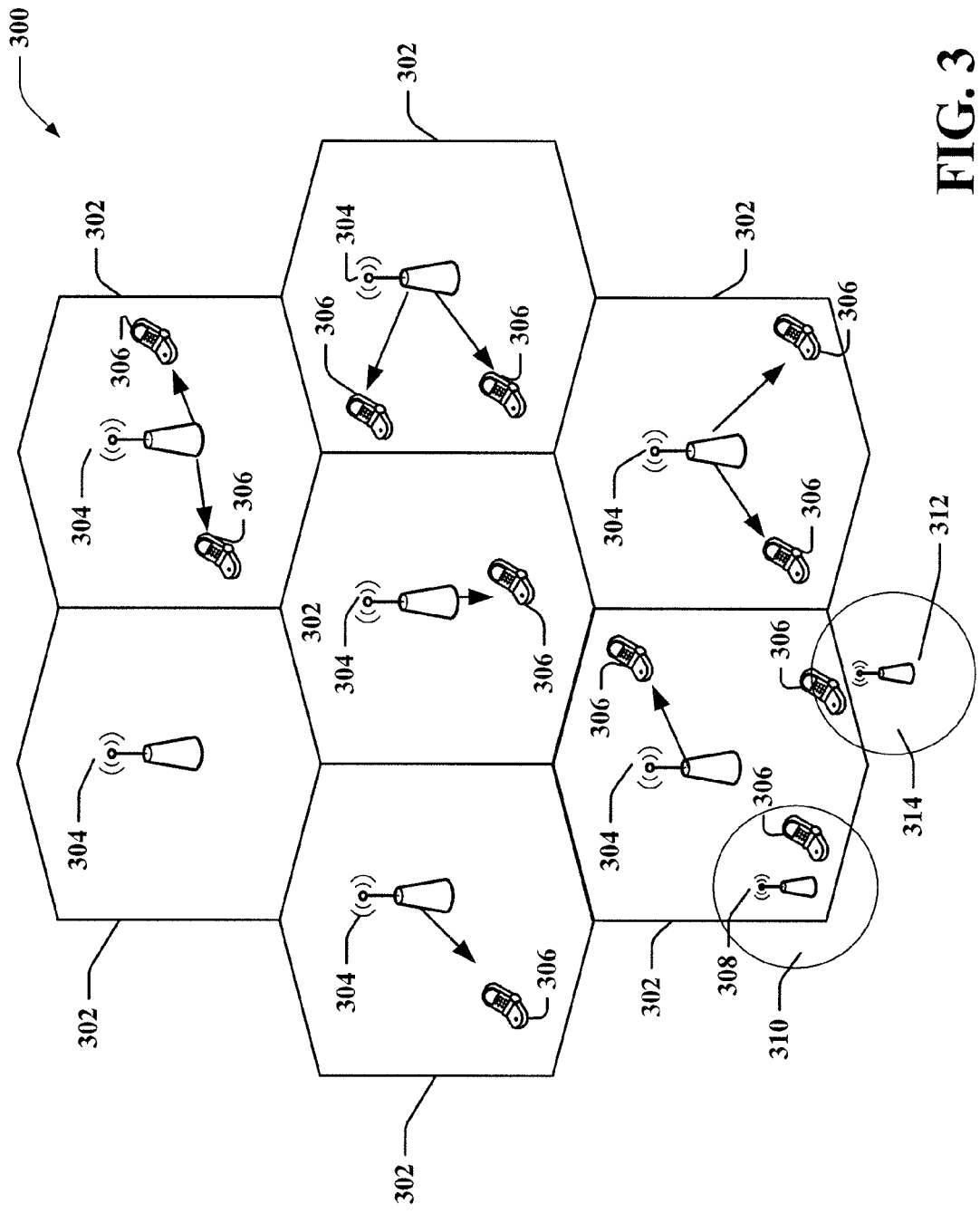
FIG. 3 is a diagram illustrating an example of an access network.

FIG. 3 is a diagram illustrating an example of an access network in an LTE network architecture. In this example, the access network 300 is divided into a number of cellular regions (cells) 302. One or more lower power class eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class or macro eNB 304 is assigned to a cell 302 and is configured to provide an access point to the EPC 210 for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 216 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 304 may have multiple antennas supporting MIMO technology. The use of MIMO technology enables the eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 306 with different spatial signatures, which enables each of the UE(s) 306 to recover the one or more data streams destined for that UE 306. On the uplink, each UE 306 transmits a spatially precoded data stream, which enables the eNB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 4:
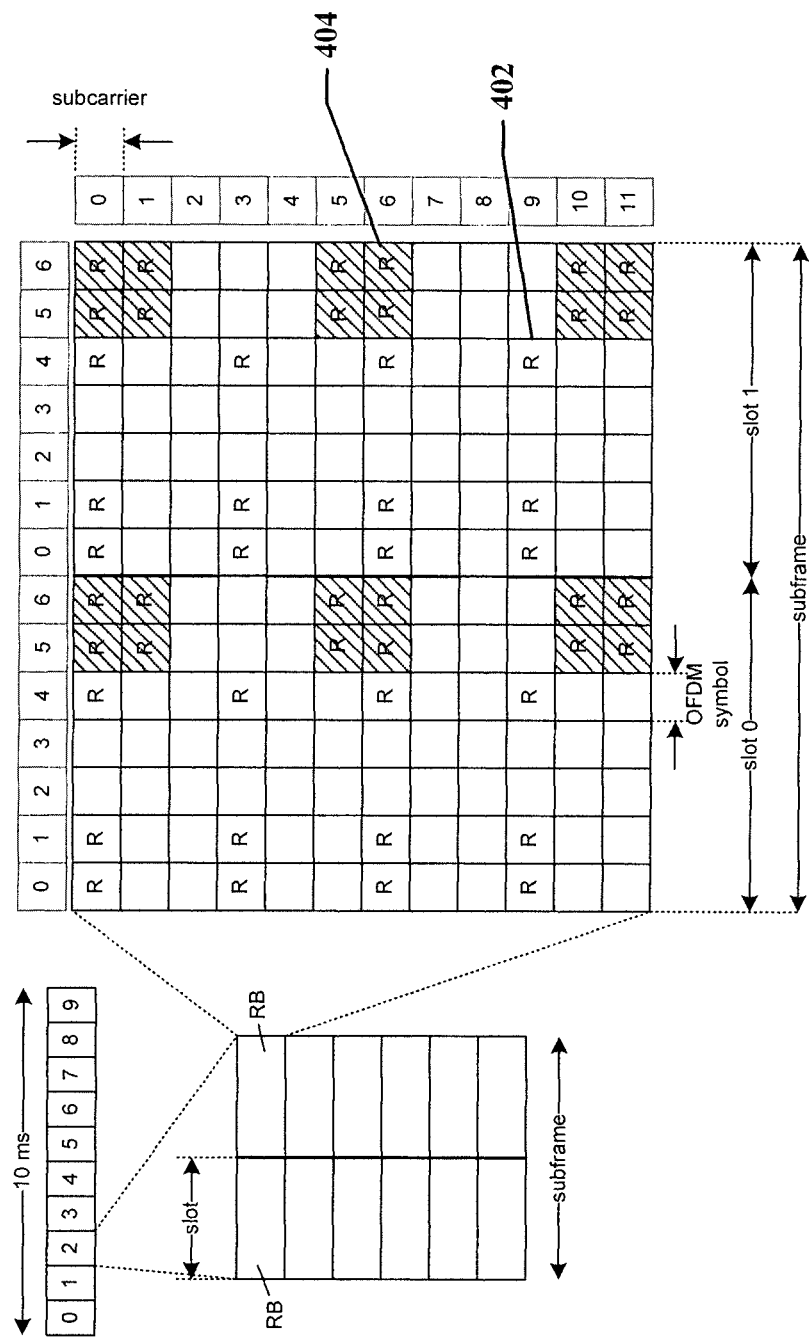
FIG. 4 is a diagram illustrating an example of a frame structure for use in an access network.

Various frame structures may be used to support the DL and UL transmissions. An example of a DL frame structure 400 will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each time slot including a resource block. The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. Some of the resource elements, as indicated as R 402, 404, include DL reference signals (DL-RS). The DL-RS include Cell-specific RS (CRS) (also sometimes called common RS) 402 and UE-specific RS (UE-RS) 404. UE-RS 404 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 5:
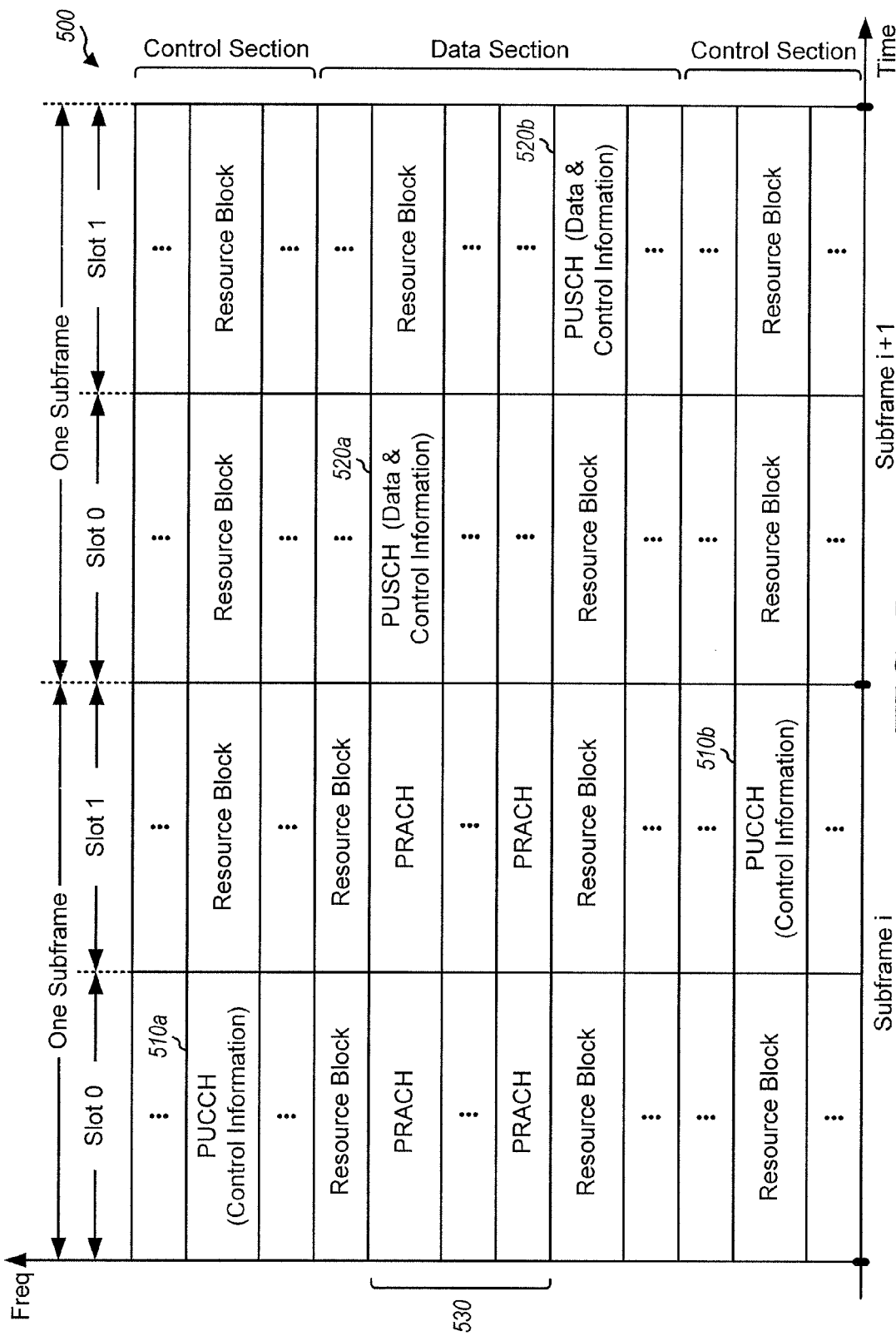
FIG. 5 shows an example format for the UL in LTE.

FIG. 5 is an example of one or more portions of a UL frame structure. FIG. 5 shows an example format for the UL in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 5 results in the data section including contiguous subcarriers, which may allow a single UE to be assigned all of the contiguous subcarriers in the data section.

A UE may be assigned resource blocks 510a, 510b in the control section to transmit control information to an eNB. The UE may also be assigned resource blocks 520a, 520b in the data section to transmit data to the eNB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A UL transmission may span both slots of a subframe and may hop across frequency as shown in FIG. 5.

As shown in FIG. 5, a set of resource blocks may be used to perform initial system access and achieve UL synchronization in a physical random access channel (PRACH) 530. The PRACH 530 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

The radio protocol architecture may take on various forms depending on the particular application. An example for an LTE system will now be presented with reference to FIG. 6.

Figure 6:
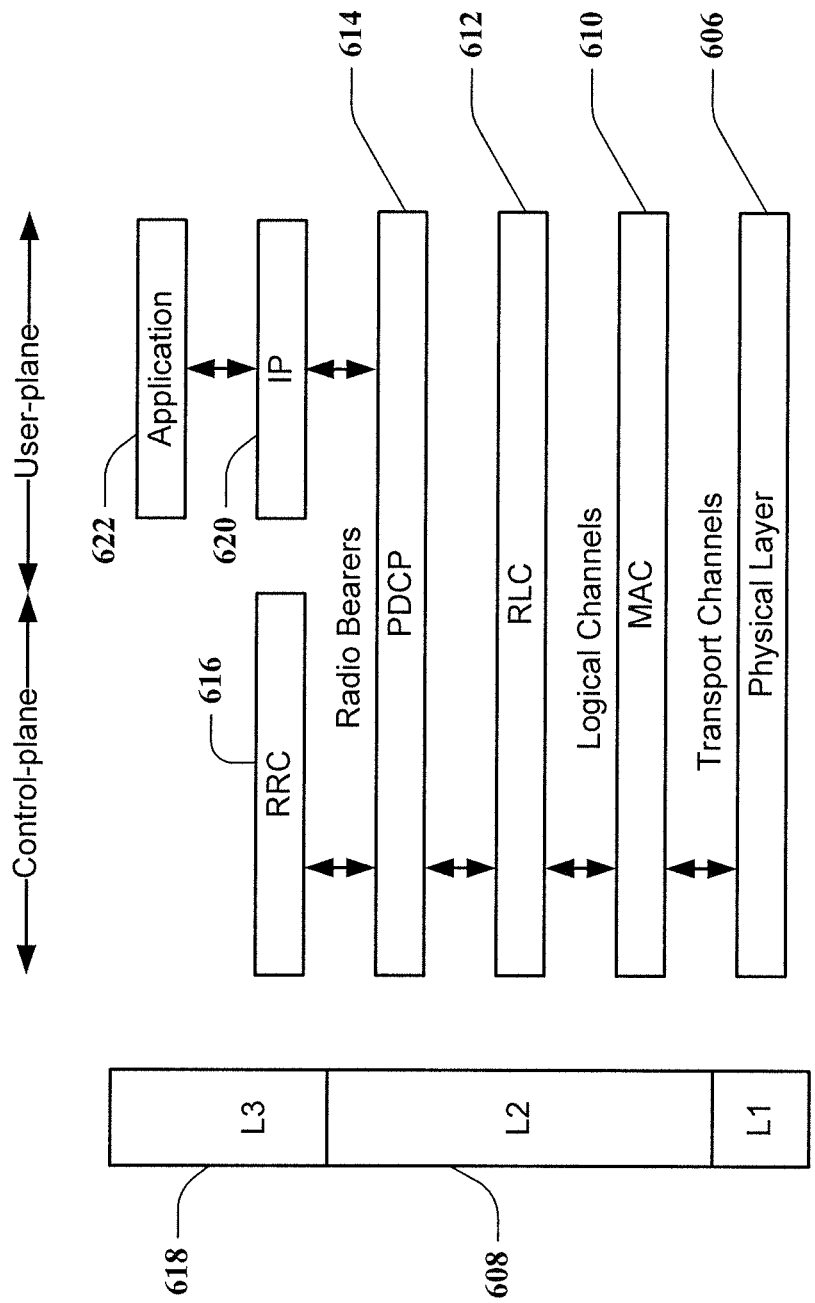
FIG. 6 is a diagram illustrating an example of a radio protocol architecture for the user and control plane.

FIG. 6 is a conceptual diagram illustrating an example of the radio protocol architecture for the user and control planes.

Turning to FIG. 6, the radio protocol architecture for the UE and the eNB is shown with three layers: Layer 1, Layer 2, and Layer 3. Layer 1 is the lowest layer and implements various physical layer signal processing functions. Layer 1 will be referred to herein as the physical layer 606. Layer 2 (L2 layer) 608 is above the physical layer 606 and is responsible for the link between the UE and eNB over the physical layer 606. Layer 3 (L3 layer) 618 is above the L2 layer 608 and is responsible for obtaining radio resources from a network in a control plane, and enabling application functionality in a user plane.

In the user plane, the L2 layer 608 includes a media access control (MAC) sublayer 610, a radio link control (RLC) sublayer 612, and a packet data convergence protocol (PDCP) 614 sublayer, which are terminated at the eNB on the network side. Although not shown, the UE may have several upper layers above the L2 layer 608 including a network layer (e.g., IP sublayer 620) that is terminated at the PDN gateway 208 (see FIG. 2) on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between eNBs. The RLC sublayer 612 provides segmentation and reassembly of upper layer data packets, retransmission of lost data packets, and reordering of data packets to compensate for out-of-order reception due to hybrid automatic repeat request (HARQ). The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

Further, in the user plane, the L3 layer 618 includes internet protocol (IP) sublayer 620, and application sublayer 622. Application sublayer 622 may be used for communications with an operating system (OS) of a UE, eNB, etc.

In the control plane, the radio protocol architecture for the UE and eNB is substantially the same for the physical layer 606 and the L2 layer 608 with the exception that there is no header compression function for the control plane. The control plane also includes a radio resource control (RRC) sublayer 616 in Layer 3. The RRC sublayer 616 is responsible for obtaining radio resources (i.e., radio bearers) and for configuring the lower layers using RRC signaling between the eNB and the UE.

Figure 7:
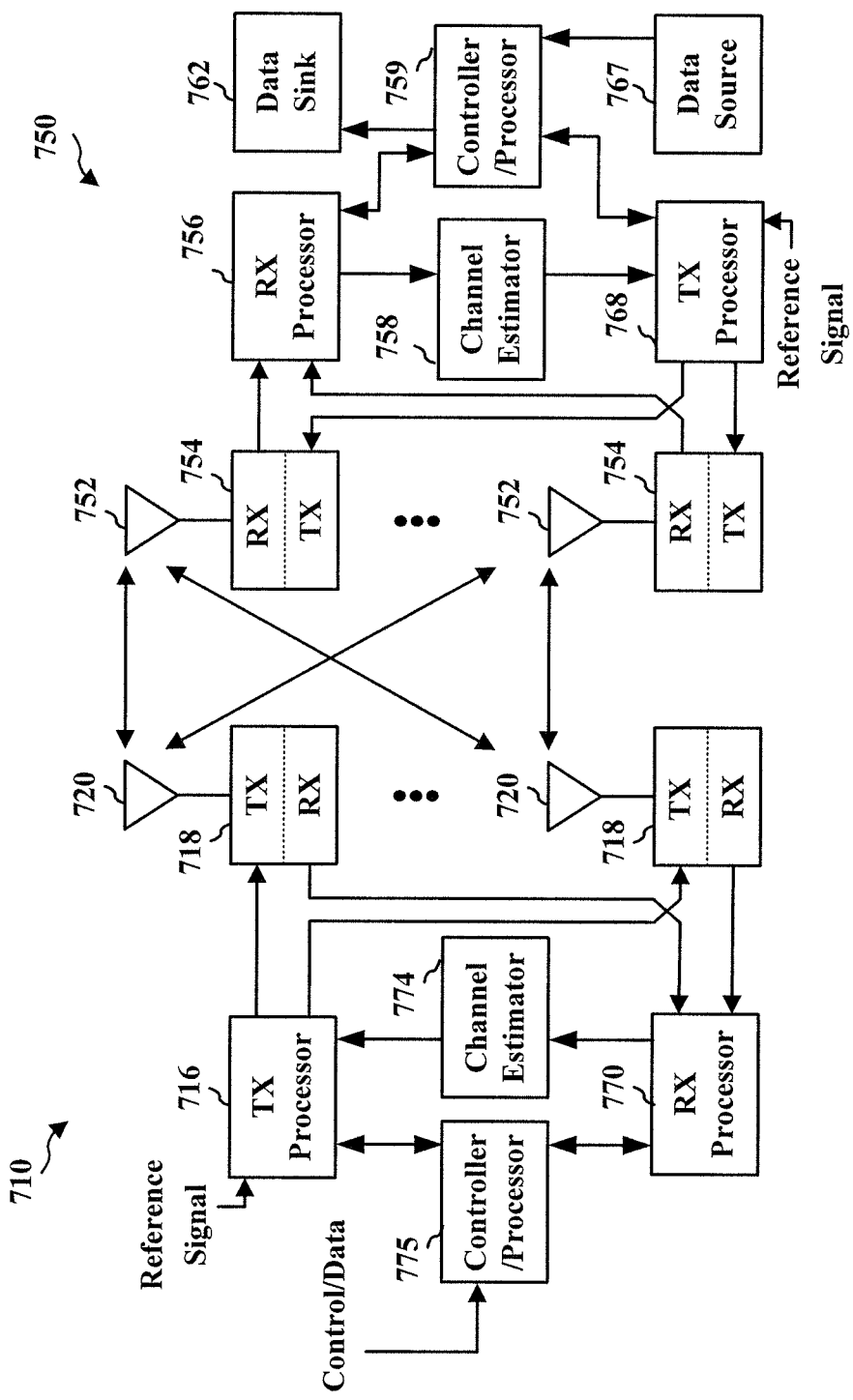
FIG. 7 is a diagram illustrating an example of an evolved Node B and user equipment in an access network.

FIG. 7 is a block diagram of an eNB 710 in communication with a UE 750 in an access network. In the DL, upper layer packets from the core network are provided to a controller/processor 775. The controller/processor 775 implements the functionality of the L2 layer described earlier in connection with FIG. 6. In the DL, the controller/processor 775 provides header compression, ciphering, packet segmentation and reordering, multiplexing between logical and transport channels, and radio resource allocations to the UE 750 based on various priority metrics. The controller/processor 775 is also responsible for HARQ operations, retransmission of lost packets, and signaling to the UE 750.

The TX processor 716 implements various signal processing functions for the L1 layer (i.e., physical layer). The signal processing functions includes coding and interleaving to facilitate forward error correction (FEC) at the UE 750 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream is then provided to a different antenna 720 via a separate transmitter 718TX. Each transmitter 718TX modulates an RF carrier with a respective spatial stream for transmission.

At the UE 750, each receiver 754RX receives a signal through its respective antenna 752. Each receiver 754RX recovers information modulated onto an RF carrier and provides the information to the receiver (RX) processor 756.

The RX processor 756 implements various signal processing functions of the L1 layer. The RX processor 756 performs spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 710. These soft decisions may be based on channel estimates computed by the channel estimator 758. The soft decisions are then decoded and deinterleaved to recover the data and control signals that were originally transmitted by the eNB 710 on the physical channel. The data and control signals are then provided to the controller/processor 759.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the core network. The upper layer packets are then provided to a data sink 762, which represents all the protocol layers above the L2 layer. Various control signals may also be provided to the data sink 762 for L3 processing. The controller/processor 759 is also responsible for error detection using an acknowledgement (ACK) and/or negative acknowledgement (NACK) protocol to support HARQ operations.

In the UL, a data source 767 is used to provide upper layer packets to the controller/processor 759. The data source 767 represents all protocol layers above the L2 layer (L2). Similar to the functionality described in connection with the DL transmission by the eNB 710, the controller/processor 759 implements the L2 layer for the user plane and the control plane by providing header compression, ciphering, packet segmentation and reordering, and multiplexing between logical and transport channels based on radio resource allocations by the eNB 710. The controller/processor 759 is also responsible for HARQ operations, retransmission of lost packets, and signaling to the eNB 710.

Channel estimates derived by a channel estimator 758 from a reference signal or feedback transmitted by the eNB 710 may be used by the TX processor 768 to select the appropriate coding and modulation schemes, and to facilitate spatial processing. The spatial streams generated by the TX processor 768 are provided to different antenna 752 via separate transmitters 754TX. Each transmitter 754TX modulates an RF carrier with a respective spatial stream for transmission.

The UL transmission is processed at the eNB 710 in a manner similar to that described in connection with the receiver function at the UE 750. Each receiver 718RX receives a signal through its respective antenna 720. Each receiver 718RX recovers information modulated onto an RF carrier and provides the information to a RX processor 770. The RX processor 770 implements the L1 layer.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the UE 750. Upper layer packets from the controller/processor 759 may be provided to the core network. The controller/processor 759 is also responsible for error detection using an ACK and/or NACK protocol to support HARQ operations.

The processing system 114 described in relation to FIG. 1 includes the UE 750. In particular, the processing system 114 includes the TX processor 768, the RX processor 756, and the controller/processor 759.

FIGS. 8, 12, 13, and 14 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
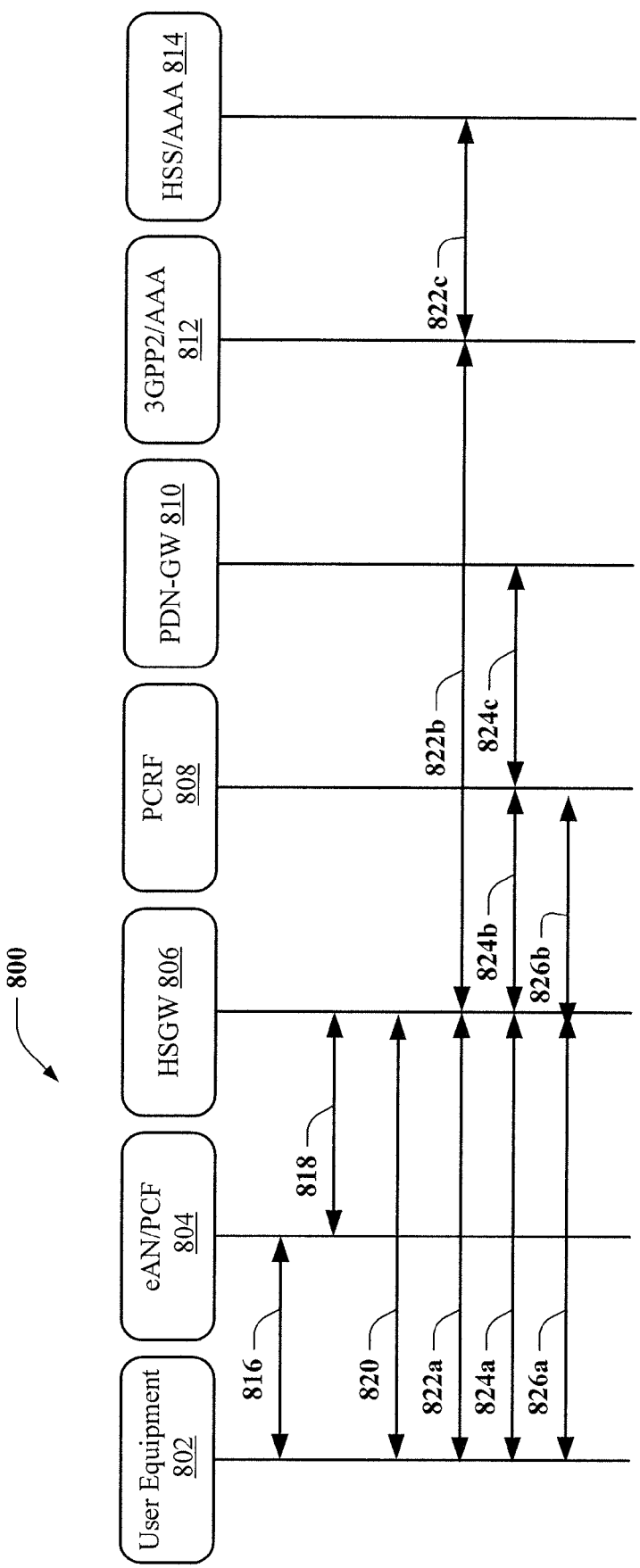
FIG. 8 is a call-flow diagram illustrating an eHRPD setup procedure.

FIG. 8 is a call-flow diagram illustrating an example eHRPD setup procedure in an access network 800. Access network 800 may include UE 802, an eNB, an MME, an evolved access network/packet control function (eAN/PCF) 804, an eHRPD serving gateway (HSGW) 806, a policy charging rules function (PCRF) 808, one or more packet data network gateways (PDN-GW) 810, a 3GPP2 authentication authorization accounting (AAA) server 812 and a home subscriber server (HSS) AAA server 814.

At act 816, UE 802 and an eAN/PCF 804 may perform an eHRPD session negotiation. At act 818, eAN/PCF 804 may register UE 802 with HSGW 806. In one aspect, registration may be performed through mobile IP registration request (RRQ) and registration response (RRP) communications. In one aspect, eAN/PCF 804 and HSGW 806 may communicate over an A11 connection. At act 820, as part of a point-to-point protocol (PPP) procedure, UE 802 and HSGW 806 may communicate link control protocol (LCP) communications. At acts 822a-c, UE 802 may attempt to authenticate the eHRPD session through communicating an extensible authentication protocol/authentication key agreement (EAP/AKA') message to 3GPP2/AAA server 812 and/or HSS AAA server 814. As discussed in detail below, rejection of the authentication request may leave UE 802 with an eHRPD radio connection without being able to receive any data. As such, various schemes are discussed below to provide UE 802 with data to avoid the above described situation.

By contrast, assuming successful authentication at acts 822a-c, then at acts 824a-c, the UE 802 and HSGW 806 establish one or more PDN connections with PDN-GW 810, through PCRF 808. At acts 826a-b, UE 802 may establish dedicated bearers (e.g., UE-initiated and/or network initiated) to support data communications.

Figure 9:
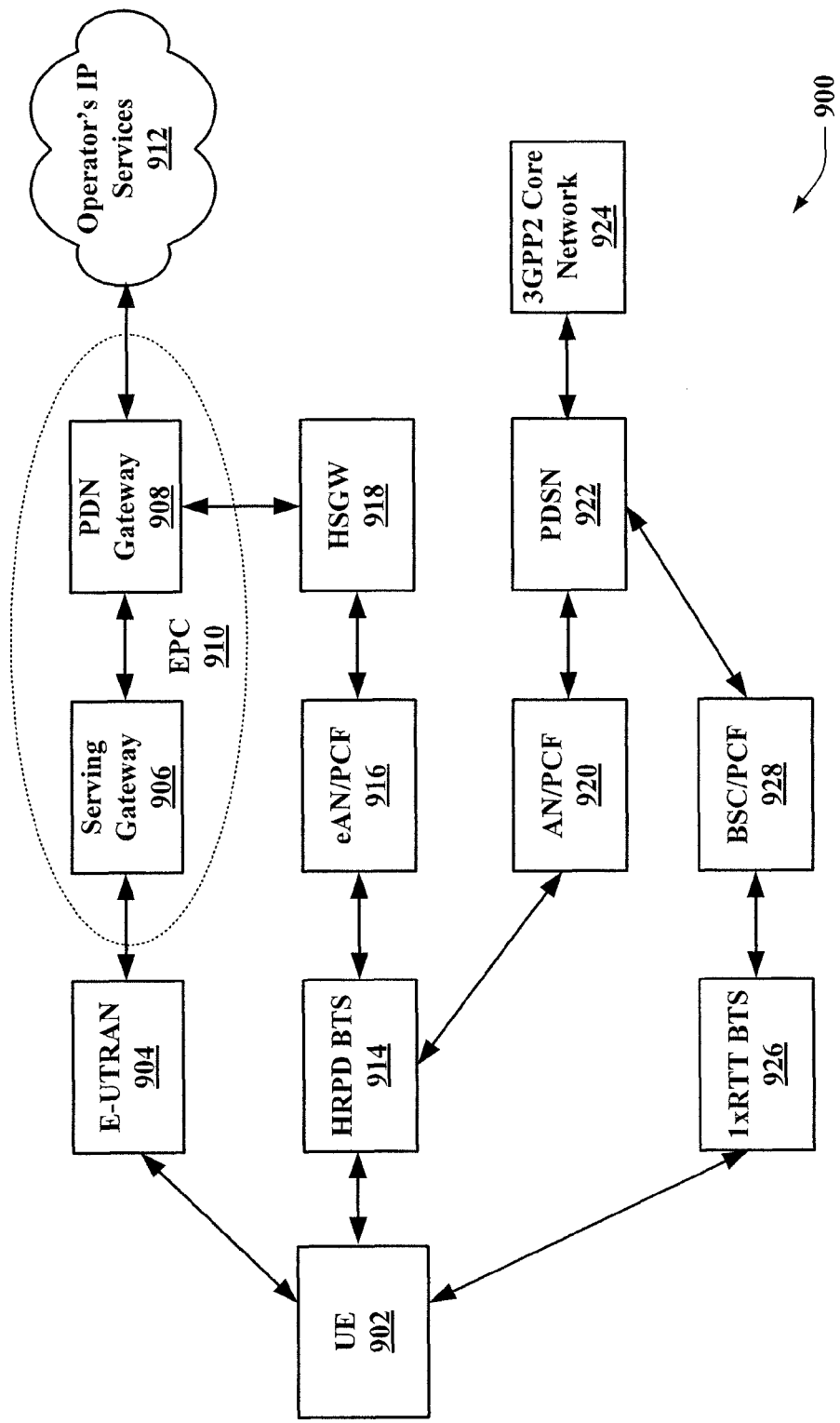
FIG. 9 is a diagram illustrating an example access network according to an aspect.

FIG. 9 is a diagram illustrating a network architecture 900 employing various apparatuses 100 (See FIG. 1). Network architecture 900 may include multiple access networks. One such access network may be referred to as an Evolved Packet System (EPS). The EPS may include one or more user equipment (UE) 902, an Evolved UMTS Terrestrial Radio Access Network (E-UTRAN) 904, an Evolved Packet Core (EPC) 910, a serving gateway (SGW) 906, a packet data network (PDN) gateway 908, and an Operator's IP Services 912. Further, network architecture 900 may include HRPD base station(s) (BTS) 914, an evolved access network/packet control function (eAN/PCF) 916, and an eHRPD service gateway (HSGW) 918. The above described elements can be serviced by a 3GPP core network (e.g., EPC 910).

Further some components in network architecture 900 may be serviced by a 3GPP2 core network 924. Such components include, access network/packet control function (AN/PCF) 920, packet data serving node (PDSN) 922, 1x radio transmission technology (1xRTT) BTS 926, and base station controller/packet control function (BSC/PCF) 928. As used herein, both HRPD and eHRPD sessions may be supported by an evolved data only (1xEV-DO) service. Generally, a 1xEV-DO session can have two personalities (e.g., HRPD and eHRPD). A UE 902 may switch from an HRPD personality to an eHRPD personality. There are multiple ways to do it. By way of example and not limitation, a UE 902 may close the 1xEV-DO session and open a new 1xEV-DO with eHRPD personality.

Generally, a multimode device (e.g., UE 902), while on 1xEV-DO radio network (supported through HRPD BTS 914), may access EPC 910 core network while using an eHRPD radio personality or access 3GPP2 core network 924 while in HRPD radio personality. Further, UE 902 may try to negotiate eHRPD radio personality with the EPC 910. After successfully negotiating eHRPD personality, the UE 902 may attempt to perform EAP-AKA' authentication with the HSGW 918 to access EPC 910. Upon encountering EAP-AKA' authentication failure, an existing UE may remain on eHRPD even though data services may not be provided due to the failed authentication. Such a UE may remain in this state because no network entity has initiated a switch to a UE radio personality for HRPD. Further, as the core network (e.g., EPC 910) may not communicate with the radio network to inform the radio network to switch the UE's radio personality, the UE may remain on the ineffective personality even though the UE could provide data services from 3GPP2 core network if UE enabled an HRPD personality. In one aspect, UE 902 may initiate a switch of radio personality to HRPD upon and/or in response to encountering EAP-AKA' authentication failure with a first system including the EPC 910 core network, for example, when UE 902 was using eHRPD radio personality. The UE 902 may switch to an HRPD personality and receive data services from 3GPP2 core network 924. In one aspect, while UE 902 receives HRPD service through 3GPP2 core network 924, the UE 902 may switch back to eHRPD personality and reattempt EAP-AKA' authentication so as to receive eHRPD service through EPC 910. In one aspect, while UE 902 receives HRPD service, UE 902 may transition between a LTE service and an EV-DO service. In another aspect, UE 902 may transition between 1x only coverage and EV-DO service. In such aspects, UE 902 may respond differently with respect to when the UE 902 attempts to re-start a first system authentication procedure. These varying approaches are discussed by way of example and not limitation with Reference to FIGS. 11A, 11B, and 11C.

In one example, as discussed above with reference to FIG. 8, UE 902 may attempt to access an eHRPD session. In such an aspect, UE 902 may communicate an EAP-AKA' request to EPC 910 through HRPD BTS 914, eAN/PCF 916, HSGW 918 and PDN gateway 908. As discussed in further detail below, UE 902 may establish a new session with a fallback system (e.g., HRPD, 1xEV-DO, eHRPD etc.) upon a determination that one or more authentications for a first system (e.g., LTE, eHRPD, etc.) has failed.

In another operational aspect, UE 902 may attempt to attach to EPC 910 through an LTE session. As both the eHRPD session and the LTE session may be supported by the EPC 910, failure of one may indicate a potential likelihood of failure of the other. For example, one may consider eHRPD EAP-AKA' and LTE authentication failures as general EPC 910 credential failures. In one aspect, certain cause codes for LTE attachment failure may be considered indicative of a general EPC 910 credentials failure. In one aspect, a service carrier may work with network vendors to identify such cause codes. In one aspect, if the UE 902 transitions to LTE from HRPD and encounters LTE attach failure, after moving back to EV-DO, UE 902 may reset a timer (e.g., BackToEHRPD-Timer) to indicate when to attempt to authenticate an eHRPD session. By way of example and not limitation, cause codes may include, attach reject with cause code #3 (e.g., Illegal UE 902), cause code #5 (e.g., Illegal mobile equipment (ME)), cause code #7 (e.g., EPS services not allowed) or cause code #8 (e.g., EPS services and non-EPS services not allowed). In some aspects, more, fewer, and/or different cause codes may be employed. Upon failure to authenticate the LTE attachment, UE 902 may fallback to accessing an HRPD session through a 3GPP2 Core Network 924. Further, in an aspect in which a counter may be used to decrement attempts before ceasing to attempt to authenticate an eHRPD session when the counter reaches zero or some other value, failure to authenticate an LTE session may also decrement the same counter. In an aspect, a UE having an established eHRPD personality and previous EAP-AKA' authentication success, may transition to an LTE system. However, the LTE attach may fail due to authentication failure. In such aspect, the UE may account for such LTE authentication failure by updating the attempt counter (e.g., by reducing the attempt counter count by 1). After moving back to a DO system, the UE may continue using the eHRPD personality if the attempt counter count does not pass a threshold (e.g., count is greater than 0).

In another aspect, a UE may transition to an LTE system. The UE may have no DO session (e.g., no radio personality established). The LTE attach may fail due to authentication failure. The UE may count LTE authentication failure by updating the attempt counter (e.g., by reducing the attempt counter count by 1). If the UE transitions to DO system, the UE may establish an eHRPD personality if the attempt counter count does not pass a threshold (e.g., count is greater than 0). Otherwise, the UE may establish an HRPD personality (e.g., if count is equals 0).

In another operational aspect, when a UE 902 receives an indication of one or more authentication failures while attempting to access an eHRPD session, the UE 902 may be operable to disable LTE attachment procedures for at least a threshold duration of time. As noted above, both the eHRPD session and the LTE session may be supported by the EPC 910, and as such failure of one may indicate a potential likelihood of failure of the other.

In another operational aspect, where UE 902 is supported only through 1xRTT BTS, a timer may be maintained without pause. After the UE 902 returns to an EV-DO coverage region, UE 902 may attempt to access eHRPD after the timer (e.g., BackToEHRPDTimer) expires.

Figure 10:
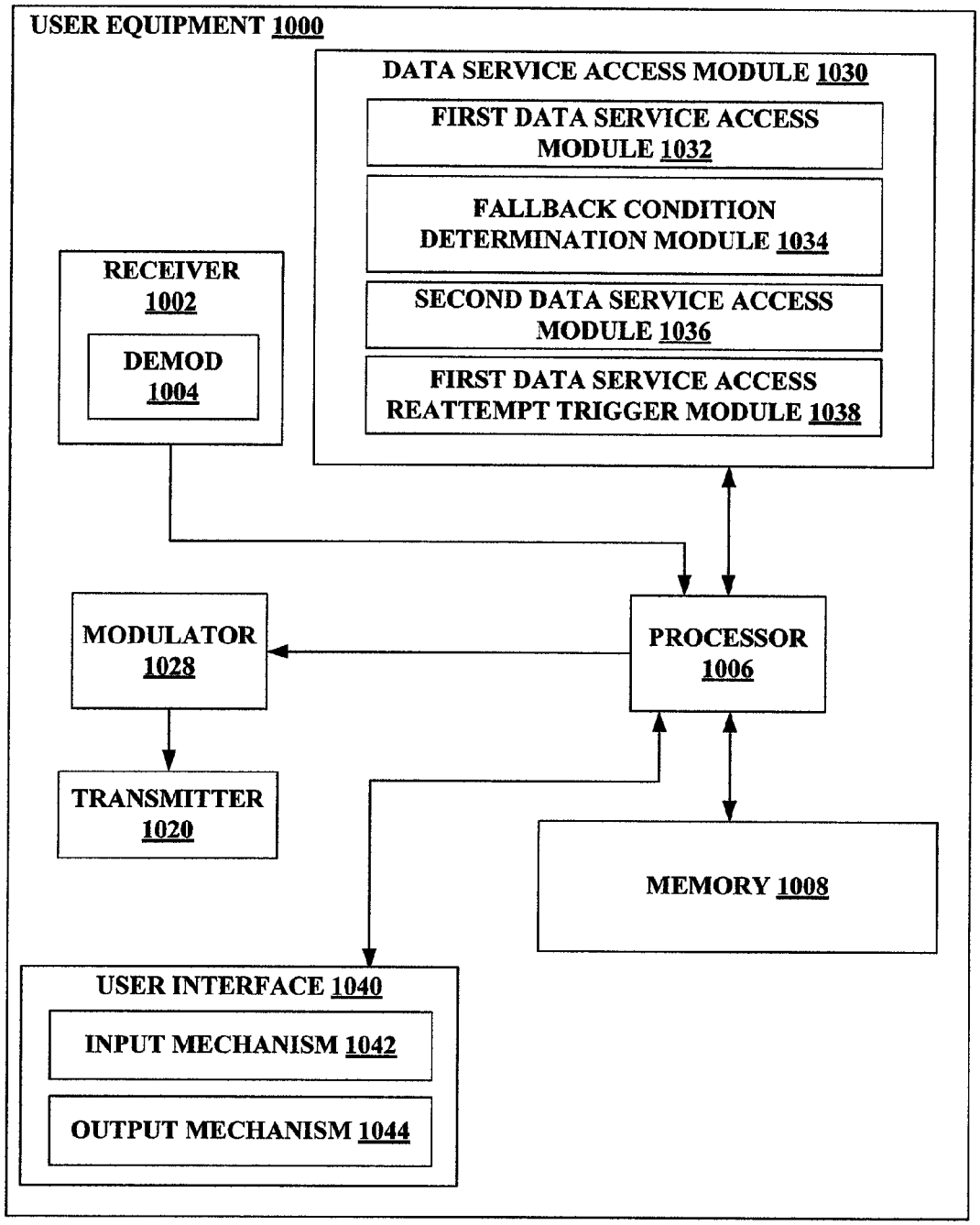
FIG. 10 is a conceptual block diagram illustrating a wireless communications device according to an aspect.

FIG. 10 illustrates an example architecture of user equipment 1000. UE 1000 comprises receiver 1002 that receives a signal from, for instance, a receive antenna (not shown), performs typical actions on (e.g., filters, amplifies, downconverts, etc.) the received signal, and digitizes the conditioned signal to obtain samples. Receiver 1002 can comprise a demodulator 1004 that can demodulate received symbols and provide them to processor 1006 for channel estimation. Processor 1006 can be a processor dedicated to analyzing information received by receiver 1002 and/or generating information for transmission by transmitter 1020, a processor that controls one or more components of UE 1000, and/or a processor that both analyzes information received by receiver 1002, generates information for transmission by transmitter 1020, and controls one or more components of UE 1000.

UE 1000 can additionally comprise memory 1008 that is operatively coupled to processor 1006 and that can store data to be transmitted, received data, information related to available channels, data associated with analyzed signal and/or interference strength, information related to an assigned channel, power, rate, or the like, and any other suitable information for estimating a channel and communicating via the channel.

Further, processor 1006 can provide means for determining whether one or more fallback conditions are present before or during establishing a data session with a first data service, and means for prohibiting further attempts to establish a data context to access the first data service based on the determination of the presence of at least one of the one or more fallback conditions.

It will be appreciated that data store (e.g., memory 1008) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). Memory 1008 of the subject systems and methods may comprise, without being limited to, these and any other suitable types of memory.

UE 1000 can further include data service access module 1030 which may be operable to enable fallback to a second data service (e.g., a HRPD data service) based on whether one or more fallback conditions are present before or during establishing a data context with a first data service (e.g., an eHRPD data service). Data service access module 1030 may include first data service access module 1032 that may be operable to attempt to establish a data context with a first data service. Data service access module 1030 may further include fallback condition determination module 1034 which may be operable to support fallback to HRPD from eHRPD upon encountering some failures over eHRPD or upon change of some eHRPD capability-relevant conditions. In an aspect, fallback condition determination module 1034 may be operable to detect various fallback conditions associated with UE 1000 capabilities, such as but not limited to, UE 1000 eHRPD capability settings, credential availability (e.g., from a USIM, non-volatile memory), networking settings for UE 1000 eHRPD capabilities. In an operational aspect, where UE 1000 does indicates a lack of eHRPD capability support then data service access module 1030 may not advertise eHRPD capabilities when negotiating a data only (DO) session. In another aspect, fallback condition determination module 1034 may be operable to detect various fallback conditions associated with data service access attempt failures. For example, data service access failures may occur during various PPP/IP layer procedures. In another aspect, fallback condition determination module 1034 may be operable to detect various fallback conditions associated with other conditions, such as but not limited to, roaming indications, etc. In an optional aspect, various functions and/or features associated with fallback condition determination module 1034 may be turned on or off based on user and/or operator preferences. In an aspect, where the UE 1000 encounters a LCP-level failure, the UE 1000 may fallback to HRPD. LCP-level failures can be categorized into hard and soft fallback failures. In an aspect, upon encountering a configurable number (e.g., MaxHardFBFailureCnt) of hard fallback failures, the UE 1000 may be prompted to fallback to HRPD. In such an aspect, when MaxHardFBFailureCnt is set to a nonzero value, an EAP-AKA' authentication failure (e.g., explicit network rejection with error code 0 or 16384) may be considered as hard fallback failure. In another aspect, when MaxHardFBFailureCnt is set to zero, explicit authentication failures may be considered as soft fallback failures. In another aspect, upon encountering a configurable number (e.g., MaxSoftFBFailureCnt) of soft callback failures, the UE may fallback to HRPD. In such an aspect, PPP LCP-level failures other than authentication failures (explicit network reject) can be considered as soft fallback failures. Further, when MaxSoftFBFailureCnt is set to zero, soft fallback failures may not cause fallback to HRPD. As such, in an operational aspect, fallback to HRPD upon LCP-level failures can be disabled by setting both MaxHardFBFailureCnt and MaxSoftFBFailureCnt to zero. Table 1 provides example configurations associated with hard fallback and soft fall back counters.

TABLE 1

Fallback to HRPD due to LCP-Level Failures

| Index | Fallback Scenerios | MaxHardFBFailureCnt | MaxSoftFBFailureCnt |
|---|---|---|---|
| 1 | Single authentication failure | 1 | 0 (Counter disabled) |
| 2 | One of the following: Single authentication failure Three LCP failures (excluding authentication failures) | 1 | 3 |
| 3 | Three LCP failures including authentication failures | 0 (Authentication failures are not counted as hard fallback failures) | 3 |
| 4 | Two authentication Failures | 2 | 0 |
| 5 | One of the Following: Two authentication failure Three LCP failures (excluding authentication failures) | 2 | 3 |
| 6 | No fallback to HRPD due to LCP failures | 2 | 0 |

In another aspect, fallback condition determination module 1034 may detect a fallback condition associated with PDN connection failure. In aspect, if the UE 1000 fails in connecting to any APN that is listed in a specific APN list (e.g., denoted FallbackAPNList) for a configurable number of times, the UE may fall back to HRPD. In another aspect, fallback condition determination module 1034 may determine whether to advertise eHRPD capabilities (e.g., prompt fallback to HRPD) based on whether the UE 1000 is roaming. When moving between home and roaming networks, the DO session may be closed by the network since there is no A13 between the home and roaming networks. As such, every time when opening a new session, the UE 1000 may account for a "roaming" indication to determine eHRPD/HRPD capability. If the roaming indication indicates TRUE, the UE may propose HRPD capability. If the roaming indication indicates FALSE and other eHRPD capability conditions are satisfied, the UE may propose eHRPD capability. Table 3 provides example operational values for various configurable fallback conditions.

TABLE 2

Various Configurable Parameters for HRPD Fallback

| Name | Unit | Default | Description |
|---|---|---|---|
| FallbackToHRPDFeature | Boolean | True | If set to TRUE, the feature of fallback to HRPD upon eHRPD failures may be turned on. |
| MaxHardFBFailureCnt | Integer | 1 | If set to a nonzero value, EAP-AKA' failures, e.g., explicit network reject, are treated as hard fallback failures, and this nonzero value specifies the number of hard fallback failures encountered before falling back to HRPD. If set to 0, explicit authentication failures may be treated as soft fallback failures |
| MaxSoftFBFailureCnt | Integer | 3 | Specifies the number of soft fallback failures encountered before falling back to HRPD. |
| FallbackAPNList | List | — | Specifies a list of APN names/labels. It can also include the default APN. If the UE fails in connecting to any APN listed in this list for some configurable number of times, the UE may fall back to HRPD. |
| MaxPDNFBFailureCnt | Integer | 0 | Specifies the number of PDN failures encountered before falling back to HRPD. If set to 0, then PDN failures may not trigger HRPD fallback. |
| DisableEHRPDinRoaming | Boolean | False | Specifies whether the roaming indication is considered when the UE determines its eHRPD capability to propose during DO session negotiation. If set to TRUE, the UE may not propose eHRPD capability when negotiating DO session. |

In another aspect, fallback condition determination module 1034 may be operable to detect that the UE 1000 is operating in a tunneling mode. When the UE 100 is connecting to eAN/HSGW through the S101 interface, LCP-level failures and PDN failures may not cause HRPD fallback. Further, when the UE 1000 evaluates the eHRPD capability conditions while in tunneling, the UE 1000 may not account for the roaming indication. Rather, while the UE 1000 is operating over the S101 interface (e.g., tunneling) and the UE 1000 is using a eHRPD personality, if one or more eHRPD capability conditions (except for LCP-level failures, PDN failures, and roaming indication) become "unsatisfied," the UE may close the current session and propose a new session with HRPD capability over tunneling. In such an aspect, the PPP/IP context that may have been created for eHRPD may be released. The UE 1000 may not create a data session for HRPD over the S101 interface. Further, at a later time, if the UE 1000 reevaluates the eHRPD capability conditions and all conditions are satisfied while the UE 1000 is in an LTE region that allows preregistration, the UE may close the current session and try to open a new session with eHRPD capability over the S101 interface. In other words, in such an aspect, if the UE 1000 connects to eAN through the S101 interface and determines to restore eHRPD capability, the UE 1000 may restore eHRPD capability over the S101 interface.

Upon a determination that one or more fallback conditions are present, second data service access module 1036 may attempt to access a second data service (e.g., HRPD). Further, data access service module 1030 may set one or more failure flags to "True." For example, if either MaxHardFBFailureCnt or MaxSoftFBFailureCnt is reached, the UE may set a flag (e.g., FBOnLCPFailure) to TRUE and fall back to HRPD. When determining to fall back to HRPD, the UE may clear an eHRPD DCTM throttling counter and timer associated with the current system. Further, the UE may reset FBOnLCPFailure to FALSE and clear the hard and soft fallback failure counters. If the UE succeeds in the failed LCP procedure, the UE shall clear the hard and soft fallback failure counters. Table 3 provides examples for fallback flag values associated with LCP level and PDN failures.

TABLE 3

Variables for HRPD Fallback upon LCP/PDN Failure

| Name | Unit | Default | Description |
|---|---|---|---|
| FBOnLCPFailure | Boolean | False | If either MaxHardFBFailureCnt or MaxSoftFailureCnt is reached, set FBOnLCPFailure to TRUE and fall back to HRPD. |
| FBOnPDNFailure | Boolean | False | If MaxPDNFBFailureCnt is reached, set FBOnPDNFailure to TRUE and fall back to HRPD. |

In an optional aspect, UE may allow the feature of fallback to HRPD upon PDN failure to be turned on or off by setting a value (e.g., MaxPDNFBFailureCnt) to be zero.

Data service access module 1030 may further include first data service access reattempt trigger module 1038. When first data service access reattempt trigger module 1038 determines to restore eHRPD capabilities, the UE 1000 may close the current second data service data session (by sending the SessionClose message) and propose a new session with eHRPD capability. In an aspect, the reattempt triggers may be event based and/or timer based. Event based triggers include, but are not limited to a determination that a session is reopened after being closed due to reasons other than fallback failure conditions, determination that the UE has successfully attached to a LTE network, determination that a power cycle has completed, etc. For example, where a session reopens after being closed (by the network/UE) due to reasons other than eHRPD LCP level or PDN connection fallback failures. The UE may propose eHRPD capability if eHRPD capability conditions are satisfied when negotiating the new session. Such session reopening may occur when the UE 1000 moves between the AN and eAN while A13 is not supported between the AN and eAN. During such a move, the network may be configured to close the session if A13 is not supported. Another example of when such session reopening may occur is when a UE 1000 moves across subnet boundaries. Still another example of when such session reopening may occur when the network closes the session after the fallback failure is fixed at network. In another example, the UE 1000 may successfully attach to a LTE network. In such an aspect, upon transition to DO, if the current session is HRPD and eHRPD capability conditions are satisfied, the UE may try to restore eHRPD capability. In an aspect, the UE may be configured to use a flag (e.g., ImmdRstrEHRPDAfterIRAT) to indicate whether immediate restoring of eHRPD capability is allowed if LTE attach succeeds. In such an aspect, the UE 1000 may allow carriers to provision this flag. In another example, the UE 1000 may determine a power cycle has been completed. In such an aspect, the UE 1000 may evaluate the eHRPD capability conditions and if the outcome is eHRPD capability and the current DO session is HRPD, the UE may try to restore eHRPD capability.

Figure 11A:
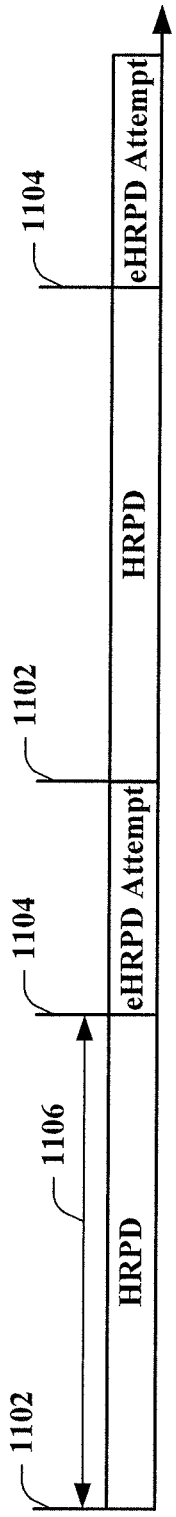
FIG. 11A is a diagram illustrating an example implementation of a fallback scheme according to an aspect.
Figure 11B:
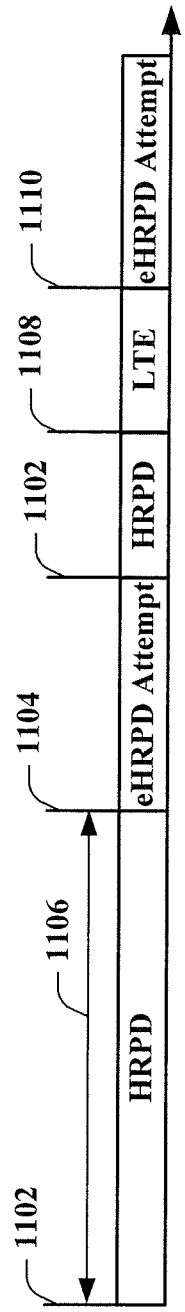
FIG. 11B is a diagram illustrating an example implementation of another fallback scheme according to an aspect.
Figure 11C:
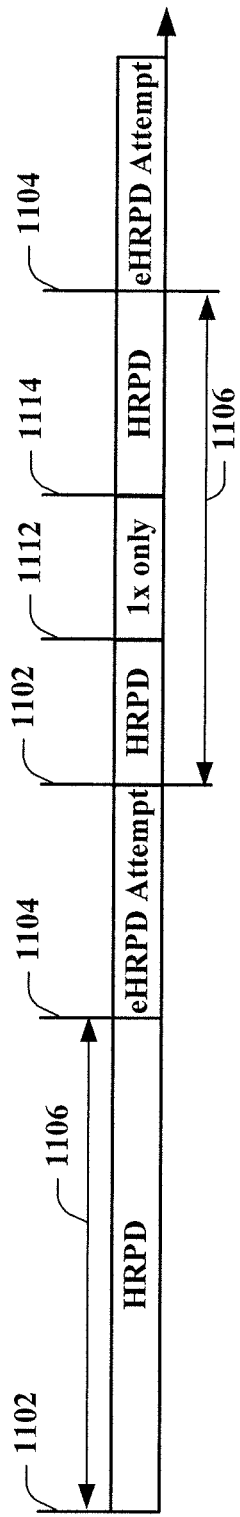
FIG. 11C is a diagram illustrating an example implementation of still another fallback scheme according to an aspect.

Timer based (e.g., periodic) triggers may include a reattempt timer. After fallback to HRPD based on one or more fallback failures, as described above, the UE 1000 may periodically change to eHRPD to reattempt the failed procedure. The period timer (e.g., BackToEHRPDTimer), may be configurable and can be made telescopic. In such an aspect, the UE 1000 may allow the timer value to be provisioned over-the-air and may introduce some randomization to the timer value. In operation, first data service access reattempt trigger module 1038 may start BackToEHRPDTimer when the UE 1000 falls back to HRPD upon LCP-level failures or PDN failures. In an aspect, when the BackToEHRPDTimer expires and a data session is dormant, the UE may try to restore eHRPD capability if eHRPD capability conditions are satisfied. In another aspect, first data service access reattempt trigger module 1038 may maintain the BackToEHRPDTimer across HRPD and 1X. In such an aspect, if the UE 1000 moves out of DO and only has 1X service, after moving back to DO coverage, the UE 1000 may switch to eHRPD after the BackToEHRPDTimer expires. In another aspect, first data service access reattempt trigger module 1038 may clear the timer at completion of a power cycle, a session closing, etc. In another aspect, the one or more attributes of the timer may be disabled. FIGS. 11A, 11B, and 11C provide example operational aspects based on various reattempt triggers. Table 4 provides values and description associated with example timer values.

TABLE 4

Variables for Restoring eHRPD

| Name | Unit | Default | Description |
| --- | --- | --- | --- |
| ImmdRstrEHRPDAfterIRAT | Boolean | True | Specifies whether the UE may try to restore eHRPD capability immediately upon transition to DO after LTE attach succeeds. |

TABLE 4-continued

Variables for Restoring eHRPD

| Name | Unit | Default | Description |
| --- | --- | --- | --- |
| | | | If set to TRUE, after successful LTE attach, upon transitioning to DO, the UE may restore eHRPD capability if all eHRPD capability conditions are satisfied. If set to FALSE, after successful LTE attach, upon transitioning to DO, the UE retains HRPD session until any other event defined in this section triggers the UE to restore eHRPD capability. |
| BackToEHRPDTimer | Minutes | 120 + r value | Specifies the period of time when the UE stays on HRPD due to LCP failures. Upon expiry of this timer and if data session is in dormant, the UE may switch to eHRPD to attempt authentication. r is a random number that follows discrete uniform distribution between 0 and half of BackToEHRPDTimer. |

Further description associated with the implementation of the data service access module 1030 is provided with reference to FIGS. 11A, 11B, 11C, 12, 13, and 14.

In another aspect, data service access module 1030 may be operable to provide auto silent redial for the UE 1000 to a 1x service. In such an aspect, if UE 1000 does not transition to Auto state while on eHRPD, silent redial over 1x may happen after UE 1000 falls back to HRPD.

Additionally, UE 1000 may include user interface 1040. User interface 1040 may include input mechanisms 1042 for generating inputs into UE 1000, and output mechanism 1044 for generating information for consumption by the user of the UE 1000. For example, input mechanism 1042 may include a mechanism such as a key or keyboard, a mouse, a touch-screen display, a microphone, etc. Further, for example, output mechanism 1044 may include a display, an audio speaker, a haptic feedback mechanism, etc.

FIGS. 11A, 11B, and 11C illustrate an example implementation of an HRPD fallback and reattempt to authenticate with eHRPD personality with a data network as time progresses, according to various aspects. With reference to FIG. 11A, a UE may cease to attempt 1102 to authenticate with the eHRPD network. In one aspect, the UE may cease to attempt to authenticate with the eHRPD network when a counter is decremented to zero in response to receiving multiple authentication failure notifications. At such a time, the UE may switch to HRPD personality and a timer 1106 may be set. As described herein, the timer may provide a duration during which the UE may be serviced through the HRPD network using an HRPD personality. Once the timer has expired 1106, the UE may switch to an eHRPD personality and attempt to authenticate with the eHRPD network. In some embodiments, the UE may wait until the data session is dormant before switching to the eHRPD personality. As depicted in FIG. 11A, the cycle may continue upon subsequent failures to authenticate the eHRPD network.

With reference to FIG. 11B, as discussed with reference to FIG. 11A, a UE may cease to attempt 1102 to authenticate with the eHRPD network. In one aspect, the UE may cease to attempt to authenticate with the eHRPD network when a counter is decremented to zero in response to receiving multiple authentication failure notifications. At such a time, the UE may switch to the HRPD personality and a timer 1106 may be set. In one aspect, the UE may transition to LTE coverage 1108. In such an aspect, upon successful authentication with the LTE network, the UE may stop the timer 1106. When the UE subsequently transitions back to EV-DO technology, the UE may switch to eHRPD and attempt to authenticate with the eHRPD network 1110 without waiting for the expiration of the timer 1106. In such an aspect, a flag may be set in the UE to prompt the UE to immediately switch to eHRPD and retry authenticating.

With reference to FIG. 11C, as discussed with reference to FIG. 11A, a UE may cease to attempt 1102 to authenticate with the eHRPD network. In one aspect, the UE may cease to attempt to authenticate with the eHRPD network when a counter is decremented to zero in response to receiving multiple authentication failure notifications. At such a time, the UE may switch to the HRPD personality and a timer 1106 may be set. In one aspect, the UE may transition to 1x only coverage 1112. In such an aspect, timer 1106 may not be stopped, but rather may be maintained, such that when the UE returns to an EV-DO coverage region, the UE continue the HRPD personality 1114. The HRPD personality may be maintained until the expiration of timer 1106. After expiration of timer 1106, the UE may switch to eHRPD personality and attempt to authenticate with the eHRPD network. In some aspects, the UE may wait until the data session is dormant before switching to the eHRPD personality.

Figure 12:
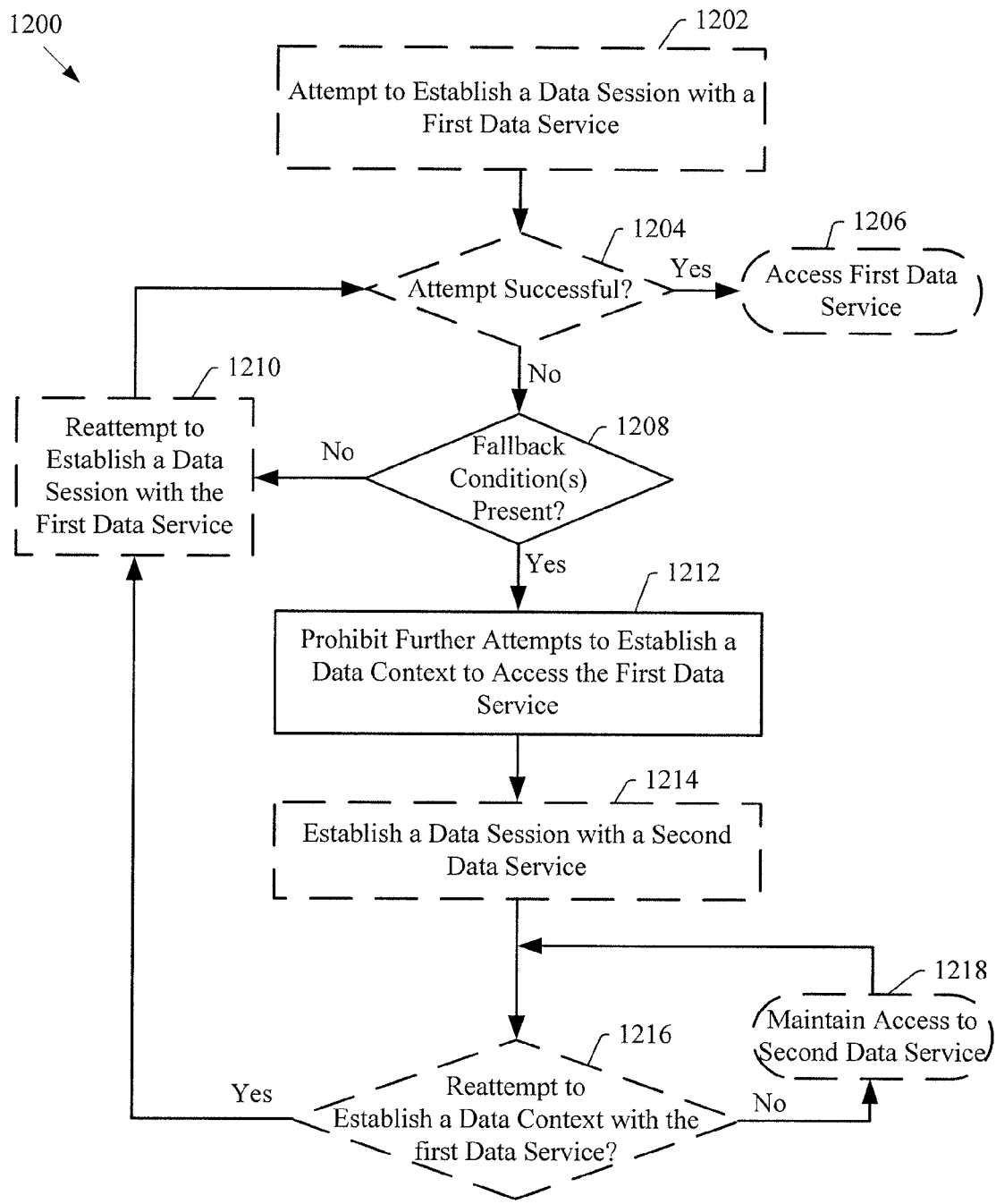
FIG. 12 is a flow chart of a first method of wireless communication according to an aspect.

FIG. 12 is a flow chart 1200 of a method of wireless communication.

In an optional aspect, at block 1202 a UE may attempt to establish a data session with a first data service. In an aspect, the first data service may be an eHRPD data service.

In another optional aspect, at block 1204, the UE may determine whether the data session was successfully established with the first data service. If at optional block 1204, the UE determines that the data session was successfully established with the first data service, then at optional block 1206, the UE may use the first data service to support data communications associated with the UE.

By contrast, if at optional block 1204, the UE determines that the data session was not successfully established with the first data service, then at block 1208, the UE may determine whether one or more fallback conditions are present before or during establishing the data session with the first data service. In an aspect, a fallback condition may indicate occurrence of a hard fallback failure. In such an aspect, the hard fallback failure may be an authentication failure. In another aspect, a fallback condition may indicate occurrence of a soft hardback failure. In such an aspect, the soft fallback failure may be a LCP negotiation procedure failure. In another aspect, a fallback condition may indicate a number of soft fallback failures that can occur prior to prohibiting further attempts to establish a data context with the first data service. In another aspect, a fallback condition may indicate occurrence of a failure of at least one APN associated with a PDN connection attempt. In an aspect, a fallback condition may be an indication that the UE is prohibited from attempting to establish the data context to access the first data service when the UE is being supported by a roaming network. In another aspect, a fallback condition may be indicated through a value set in an application profile associated with the UE.

If at block 1208, the UE determines that none of the fallback conditions are present/have been fulfilled, then at optional block 1210, the UE may reattempt to establish a data session with the first data service.

By contrast, if at block 1208, the UE determines that one or more of the fallback conditions are present/have been fulfilled, then at block 1212, the UE may prohibit further attempts to establish a data context to access the first data service.

In an optional aspect, at block 1214, the UE may establish a data session with a second data service. In an aspect, the second data service may be a HRPD data service.

In another optional aspect, at block 1216, the UE may determine whether to reattempt to establish a data context to access the first data service based on one or more first data service reconnection triggers. In one aspect, a first data service reconnection trigger may occur at the expiration of a retry timer. In one aspect, a first data service reconnection trigger may be a determination that a power cycle has been completed. In another aspect, the first data service reconnection trigger may include detection of occurrence of an event. In such an aspect, the event may be a determination by the UE that the data session with the second data service is closed and a new data session is being proposed. In another aspect, the event may be detecting that the UE has moved to a LTE supported network and the apparatus has successfully authenticated with the LTE network using an LTE system attach procedure.

If at optional block 1216, the UE determines that no reattempt triggers are present, then at optional block 1218, the UE may continue to maintain the data session with the second data service.

By contrast, if at optional block 1216, the UE determines that one or more reattempt triggers are present, then at optional block 1210, the UE may reattempt to establish a data session with the first data service.

Figure 13:
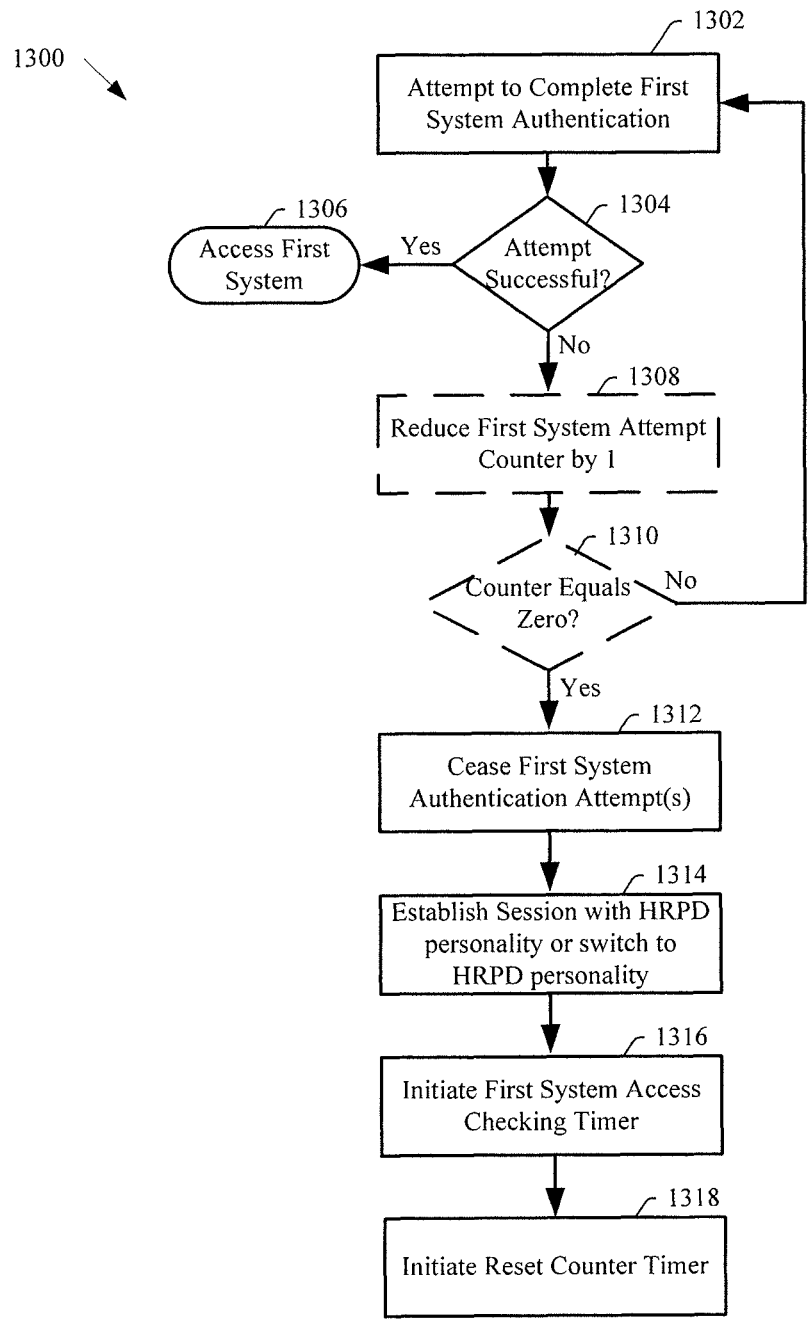
FIG. 13 is a flow chart of a second method of wireless communication according to an aspect.

FIG. 13 is a flow chart 1300 of a method of wireless communication.

At block 1302, an authentication procedure is attempted for a first system (e.g., an eHRPD system, LTE system, etc.). At block 1304, it is determined whether the authentication was successful. If at block 1304, it is determined that the authentication was successful, then at block 1306 the first system may be accessed. In one aspect, the call-flow depicted in FIG. 8 acts 824a-c and 826a-b demonstrates how the first system may be accessed. In an optional aspect, if at block 1304 it is determined that the authentication attempt failed, then at block 1308 a first system attempt counter may be reduced (e.g., decremented) by 1. Further, in the optional aspect, at block 1310 it is determined whether the first system attempt counter has reached zero. If it is determined that the first system attempt counter has not reach zero, then the process may return to block 1302. By contrast, if at block 1310 it is determined that the first system attempt counter has reached zero, then at block 1312, the UE may cease to attempt to authenticate with the first system. At block 1314, an EV-DO session may be established. In one aspect, an HRPD personality may be established for the EV-DO session. In another aspect, if the EV-DO session exists, the UE may be switched to an HRPD personality. In one aspect, where the first system is LTE and LTE authentication fails, if the UE leaves LTE and transitions to 1xEV-DO, the UE may establish an EV-DO session with an HRPD personality without having the counter reach zero.

At block 1316, a first system access checking timer may be initiated. In one aspect, while the UE is on an HRPD personality and is operable to receive HRPD service, the UE may switch (e.g., periodically) to an eHRPD personality to reattempt EAP-AKA' authentication, at block 1302. In one aspect, the period for the timer (e.g., BackToEHRPDTimer) may be configurable, and may be made telescopic. In one aspect, if BackToEHRPDTimer expires and data call is dormant, UE may switch to eHRPD to retry authentication at block 1302. Various factors may be taken into account when configuring the first system access checking timer. By way of example and not limitation, tradeoffs between signaling overhead and the time UE stays on HRPD may be taken into consideration. For example, if the network issue that causes authentication failure cannot be fixed in some reasonable period of time, then setting a short timer may result in large radio signaling overhead and network congestion. At block 1318, a reset counter timer may be set. In one aspect, the reset counter timer (e.g., RestAuthAttemptCounter) may prompt the UE to reset the first system attempt counter after a defined time duration.

Figure 14:
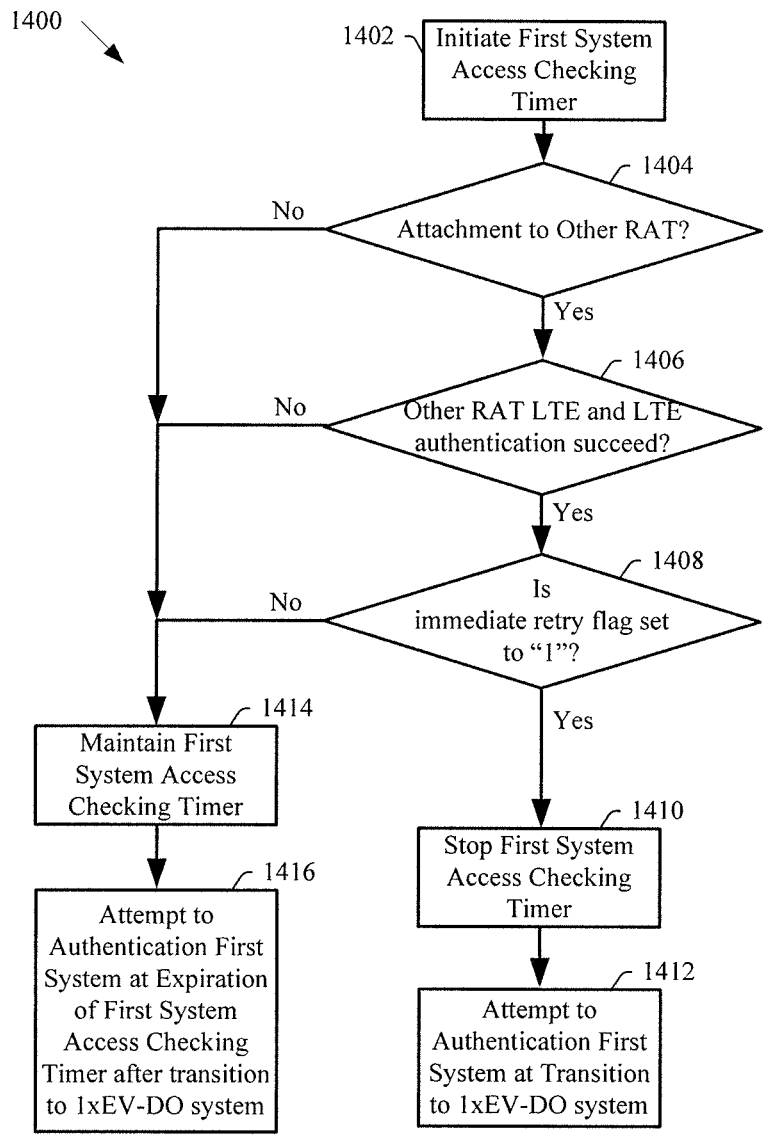
FIG. 14 is a flow chart of a third method of wireless communication according to an aspect.

FIG. 14 is a flow chart 1400 of another method of wireless communication. In one aspect, occurrence of an event, such as establishing connections with other RATs, may trigger the UE to respond. In flowchart 1400, an aspect in which the UE may transition to another RAT while being supported by HRPD is discussed.

As noted with reference to FIG. 13, block 1316, at block 1402 a first system access checking timer may be initiated. At block 1404, it is determined whether the UE has transitioned (e.g., attached) to another RAT. If at block 1404, it is determined that the UE has transitioned to another RAT, then at block 1406 it is determined whether the other RAT is an LTE system and LTE authentication is successful.

In one aspect, the UE may be configured with an immediate retry flag (e.g., ImmdRetryAuthAfterIRAT), to indicate whether an immediate switch to eHRPD is allowed upon transitioning to 1xEV-DO. For example, the flag may specify whether the UE may immediately switch to an eHRPD personality when the UE moves from LTE to 1xEV-DO (if LTE authentication is successful). In such an example, the UE may immediately switch to the eHRPD personality when UE moves to 1xEV-DO coverage. In such an aspect, the UE may stop the timer (e.g., BackToEHRPDTimer), if LTE attachment is successful. If at block 1406 it is determined that the other RAT is an LTE system and LTE authentication is successful, then at block 1408 it is determined whether an immediate retry flag is set to "1". In one aspect, setting an immediate retry flag to "1" may prompt the UE to attempt first system authentication as soon as the UE transitions into a 1xEV-DO system. In one aspect, if the flag is set to "0", e.g."False", then after the UE moves to 1xEV-DO, the UE may switch to eHRPD if the first service access checking timer expires and data session is in dormant. As used herein, "immediate" is not limited to an instantaneous occurrence, but rather an occurrence within a time frame shorter than a time defined by the first system access checking timer. If at block 1408 it is determined that the immediate retry flag to set to "1", then at block 1410 the UE may stop the first system access checking timer. In such an aspect, when the UE transitions to LTE from HRPD and LTE attach succeeds, the UE may stop the timer (e.g., BackToEHRPDTimer). At block 1412, if UE transitions back to coverage of a 1xEV-DO system, since BackToEHRPDTimer may be stopped, the UE may switch to eHRPD personality to reattempt EAP-AKA' authentication. In another aspect, if S101 is supported, UE may switch to eHRPD over a S101 connection when the timer expires.

By contrast, if the UE has not transitioned to another RAT (at block 1404), and/or if the other RAT is not an LTE system (at block 1406), and/or if the immediate retry flag is not set (e.g., not set to "1", "true"), then at block 1414, the first system access checking timer may be maintained. In one aspect, the UE may transition to a 1x coverage only. When the UE moves out of 1xEV-DO and has 1x service only, the UE may maintain the timer, (e.g., keep the timer running without stopping and/or resetting it). At block 1416, after transitioning to 1xEV-DO, upon expiration of the first system access checking timer, the UE may switch to eHRPD personality to reattempt EAP-AKA' authentication.

Figure 15:
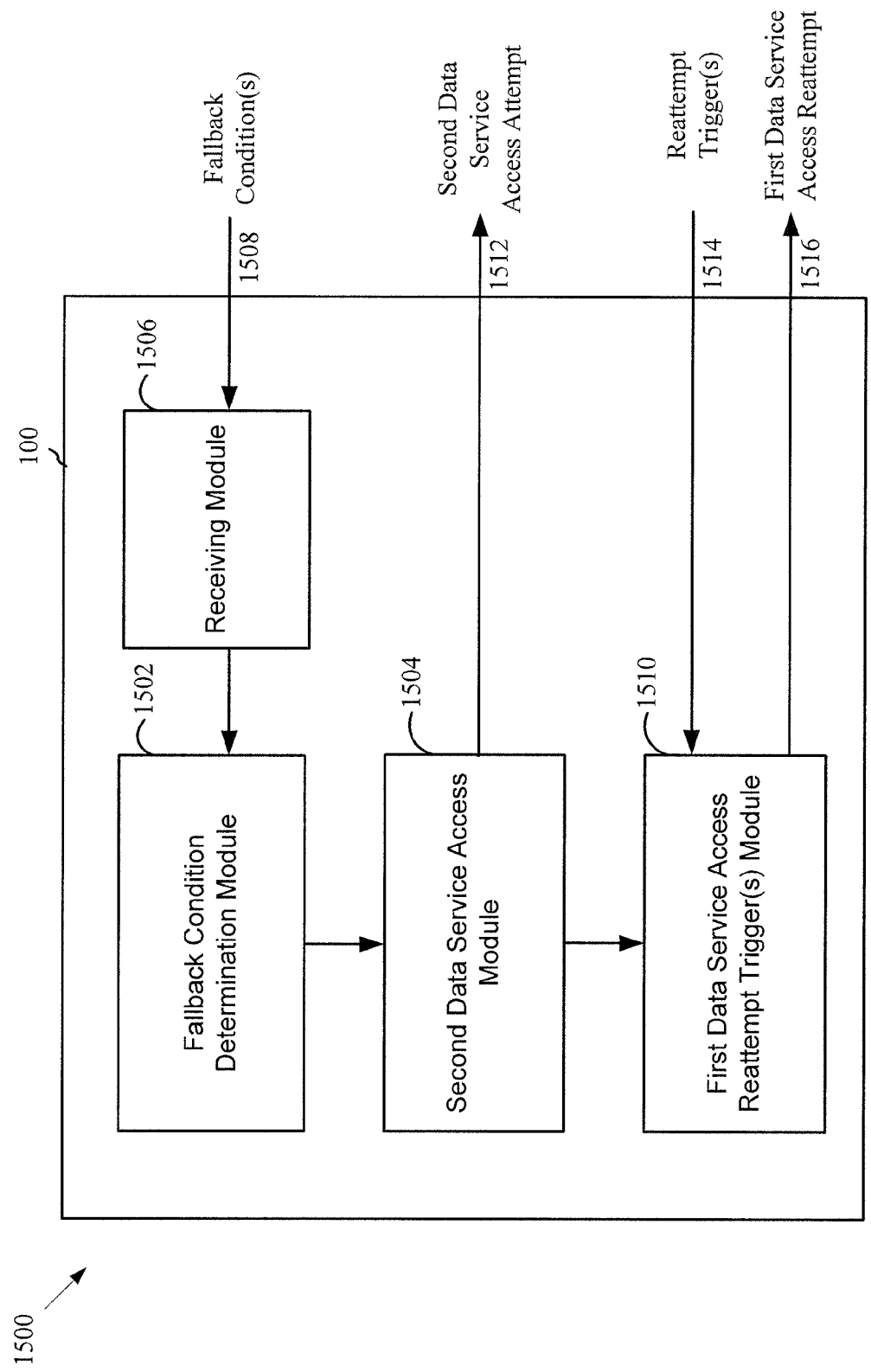
FIG. 15 is a conceptual block diagram illustrating the functionality of an example apparatus.

FIG. 15 is a conceptual block diagram 1500 illustrating the functionality of an example apparatus 100. The apparatus 100 includes a fallback condition determination module 1502 determining whether one or more fallback conditions 1508, received from receiving module 1506, are present before or during establishing a data session with a first data service, and prohibiting further attempts to establish a data context to access the first data service based on the determination of the presence of at least one of the one or more fallback conditions. The apparatus 100 further includes a second data service access module 1504 that is configured to establish a data session with a second data service 1512. In one aspect, second data service access module 1504 may establish an EV-DO session with HRPD personality or may switch to a HRPD personality in response to the prohibition against attempting to access the first data service. Further, apparatus 100 may include and a first data service access reattempt trigger module 1510 that may be configured to determine whether to reattempt to establish a data context to access the first data service 1516 based on one or more first data service reconnection triggers (e.g., reattempt connection triggers 1514). The apparatus 100 may include additional modules that perform each of the steps in the aforementioned flow charts. As such, each step in the aforementioned flow charts may be performed by a module and the apparatus 100 may include one or more of those modules.

In one configuration, apparatus 100 for wireless communication includes means for determining whether one or more fallback conditions are present before or during establishing a data session with a first data service, and means for prohibiting further attempts to establish a data context to access the first data service based on the determination of the presence of at least one of the one or more fallback conditions. The first data service may be an eHRPD data service and the second data service may be a HRPD data service. In an aspect, a fallback condition may indicate occurrence of a hard fallback failure. In such an aspect, the hard fallback failure may be an authentication failure. In another aspect, a fallback condition may indicate occurrence of a soft hardback failure. In such an aspect, the soft fallback failure may be a LCP negotiation procedure failure. In an aspect, apparatus 100 may be configured to term a hard fallback condition as a soft fallback condition. In another aspect, a fallback condition may indicate a number of soft fallback failures that can occur prior to prohibiting further attempts to establish a data context with the first data service. In another aspect, a fallback condition may indicate occurrence of a failure of at least one APN associated with a PDN connection attempt. In an aspect, a fallback condition may be an indication that the apparatus 100 is prohibited from attempting to establish the data context to access the first data service when the apparatus 100 is being supported by a roaming network. In another aspect, a fallback condition may be indicated through a value set in an application profile associated with the apparatus 100.

In another configuration, apparatus 100 may further include means for establishing a data session with a second data service, and means for determining whether to reattempt to establish a data context to access the first data service based on one or more first data service reconnection triggers. In one aspect, a first data service reconnection trigger may occur at the expiration of a retry timer. In one aspect, a first data service reconnection trigger may a determination that a power cycle has been completed. In another aspect, the first data service reconnection trigger may include detection of occurrence of an event. In such an aspect, the event may be a determination by the apparatus 100 that the data session with the second data service is closed and a new data session is being proposed. In another aspect, the event may be detecting that the apparatus 100 has moved to a LTE supported network and the apparatus has successfully authenticated with the LTE network using an LTE system attach procedure. In such an aspect, the apparatus 100 may include means for using a LTE tunnel to pre-register with the second data service. Further, in such an aspect, the apparatus 100 may include means for reattempting to establish a data context to access the first data service over the LTE tunnel. In another aspect, the apparatus 100 may include means for reattempting to establish a data context to access the first data service prior to expiration of a retry timer upon a determination that the apparatus is supported by a LTE network. In an aspect, the apparatus 100 may further include means for detecting that the apparatus 100 has moved to a location that includes coverage based on a common access network associated with the first data service and the second data service, and means for reattempting to establish a data context to access the first data service based on the detection.

The aforementioned means may be one or more of the aforementioned modules of the apparatus 100 (see FIG. 10) and/or the processing system 114 configured to perform the functions recited by the aforementioned means. As described supra, the processing system 114 includes the TX Processor 768, the RX Processor 756, and the controller/processor 759. As such, in one configuration, the aforementioned means may be the TX Processor 768, the RX Processor 756, and the controller/processor 759 configured to perform the functions recited by the aforementioned means.

It is understood that the specific order or hierarchy of steps in the processes disclosed is an illustration of example approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications, comprising:
    determining whether one or more fallback conditions are present before or during establishing a data session with a first data service via a first data system; and
    prohibiting further attempts to establish a data context to access the first data service via the first data system based on the determination of the presence of at least one of the one or more fallback conditions;
    wherein one of the one or more fallback conditions indicates an occurrence of a hard fallback failure or an occurrence of a soft fallback failure;
    wherein when the one of the one or more fallback conditions indicates the occurrence of the hard fallback failure, the first data service comprises an evolved high rate packet data (eHRPD) service, and the hard fallback failure comprises an authentication failure; and
    wherein when the one or more fallback conditions indicates the occurrence of the soft fallback failure, the first data service comprises the eHRPD service, and the soft fallback failure comprises a link control protocol (LCP) negotiation procedure failure.

2. The method of claim 1, wherein one of the one or more fallback conditions indicates a number of soft fallback failures that can occur prior to prohibiting the attempt to establish the data context to access the first data service.

3. The method of claim 1, wherein one of the one or more fallback conditions indicates that the occurrence of the hard fallback failure is to be treated as the occurrence of the soft fallback failure.

4. The method of claim 1, wherein one of the one or more fallback conditions indicates occurrence of a failure of at least one access point name (APN) associated with a packet data network (PDN) connection attempt.

5. The method of claim 1, wherein one of the one or more fallback conditions indicates that a user equipment (UE) is prohibited from attempting to establish the data context to access the first data service when the UE is being supported by a roaming network.

6. The method of claim 1, wherein one of the one or more fallback conditions indicates that a user equipment (UE) is prohibited from attempting to establish the data context to access the first data service when a value is set in an application profile associated with the UE.

7. The method of claim 1, further comprising:
    establishing a data session with a second data service via a second data system; and
    determining whether to reattempt to establish a data context to access the first data service via the first data system based on one or more first data service reconnection triggers.

8. The method of claim 7, wherein one of the first data service reconnection triggers comprises expiration of a retry timer.

9. The method of claim 7, wherein one of the first data service reconnection triggers comprises detection of an event occurrence.

10. The method of claim 9, wherein detection of the event occurrence further comprises determining that the data session with the second data service is closed and a new data session is being proposed.

11. The method of claim 9, further comprising moving to long term evolution (LTE) network and wherein detection of the event occurrence further comprises determining that a successful authentication to the LTE network has been performed based on an LTE system attach procedure.

12. The method of claim 11, further comprising using a LTE tunnel to pre-register with the second data service.

13. The method of claim 12, further comprising reattempting to establish a data context to access the first data service over the LTE tunnel.

14. The method of claim 11, further comprising reattempting to establish a data context to access the first data service prior to expiration of a retry timer.

15. The method of claim 11, further comprising:
detecting that a UE has moved to a location that includes coverage based on a common access network associated with the first data service and the second data service; and
reattempting to establish a data context to access the first data service based on the detection.

16. The method of claim 9, wherein detection of the event occurrence further comprises determining that a power cycle has been completed.

17. The method of claim 7, wherein the second data service is a high rate packet data (HRPD) service.

18. The method of claim 1, wherein the determining and the prohibiting are performed by a UE.

19. An apparatus for communications, comprising:
means for determining whether one or more fallback conditions are present before or during establishing a data session with a first data service via a first data system; and
means for prohibiting further attempts to establish a data context to access the first data service via the first data system based on the determination of the presence of at least one of the one or more fallback conditions;
wherein one of the one or more fallback conditions indicates an occurrence of a hard fallback failure or an occurrence of a soft fallback failure;
wherein when the one of the one or more fallback conditions indicates the occurrence of the hard fallback failure, the first data service comprises an evolved high rate packet data (eHRPD) service, and the hard fallback failure comprises an authentication failure; and
wherein when the one or more fallback conditions indicates the occurrence of the soft fallback failure, the first data service comprises the eHRPD service, and the soft fallback failure comprises a link control protocol (LCP) negotiation procedure failure.

20. The apparatus of claim 19, wherein one of the one or more fallback conditions indicates a number of soft fallback failures that can occur prior to prohibiting the attempt to establish the data context to access the first data service.

21. The apparatus of claim 19, wherein one of the one or more fallback conditions indicates that the occurrence of the hard fallback failure is to be treated as the occurrence of the soft fallback failure.

22. The apparatus of claim 19, wherein one of the one or more fallback conditions indicates occurrence of a failure of at least one access point name (APN) associated with a packet data network (PDN) connection attempt.

23. The apparatus of claim 19, wherein one of the one or more fallback conditions indicates that a user equipment (UE) is prohibited from attempting to establish the data context to access the first data service when the UE is being supported by a roaming network.

24. The apparatus of claim 19, wherein one of the one or more fallback conditions indicates that a user equipment (UE) is prohibited from attempting to establish the data context to access the first data service when a value is set in an application profile associated with the UE.

25. The apparatus of claim 19, further comprising:
means for establishing a data session with a second data service via a second data system; and
means for determining whether to reattempt to establish a data context to access the first data service via the first data system based on one or more first data service reconnection triggers.

26. The apparatus of claim 25, wherein one of the first data service reconnection triggers comprises expiration of a retry timer.

27. The apparatus of claim 25, wherein one of the first data service reconnection triggers comprises detection of an event occurrence.

28. The apparatus of claim 27, wherein detection of the event occurrence further comprises determining that the data session with the second data service is closed and a new data session is being proposed.

29. The apparatus of claim 27, further comprising moving to long term evolution (LTE) network and wherein detection of the event occurrence further comprises determining that a successful authentication to the LTE network has been performed based on an LTE system attach procedure.

30. The apparatus of claim 29, further comprising means for using a LTE tunnel to pre-register with the second data service.

31. The apparatus of claim 30, further comprising means for reattempting to establish a data context to access the first data service over the LTE tunnel.

32. The apparatus of claim 29, further comprising means for reattempting to establish a data context to access the first data service prior to expiration of a retry timer.

33. The apparatus of claim 29, further comprising:
means for detecting that a UE has moved to a location that includes coverage based on a common access network associated with the first data service and the second data service; and
means for reattempting to establish a data context to access the first data service based on the detection.

34. The apparatus of claim 27, wherein detection of the event occurrence further comprises determining that a power cycle has been completed.

35. The apparatus of claim 25, wherein the second data service is a high rate packet data (HRPD) service.

36. The apparatus of claim 19, wherein the means for determining and the means for prohibiting are included in a UE.

37. A device for communications, comprising:
a memory;
a processor coupled to the memory; and
a data service access module coupled to at least one of the memory or the processor, and configured to:
determine whether one or more fallback conditions are present before or during establishing a data session with a first data service via a first data system; and
prohibit further attempts to establish a data context to access the first data service via the first data system based on the determination of the presence of at least one of the one or more fallback conditions;

wherein one of the one or more fallback conditions indicates an occurrence of a hard fallback failure or an occurrence of a soft fallback failure;

wherein when the one of the one or more fallback conditions indicates the occurrence of the hard fallback failure, the first data service comprises an evolved high rate packet data (eHRPD) service, and the hard fallback failure comprises an authentication failure; and wherein when the one or more fallback conditions indicates the occurrence of the soft fallback failure, the first data service comprises the eHRPD service, and the soft fallback failure comprises a link control protocol (LCP) negotiation procedure failure.

38. The apparatus of claim 37, wherein one of the one or more fallback conditions indicates a number of soft fallback failures that can occur prior to prohibiting the attempt to establish the data context to access the first data service.

39. The apparatus of claim 37, wherein one of the one or more fallback conditions indicates that the occurrence of the hard fallback failure is to be treated as the occurrence of the soft fallback failure.

40. The apparatus of claim 37, wherein one of the one or more fallback conditions indicates occurrence of a failure of at least one access point name (APN) associated with a packet data network (PDN) connection attempt.

41. The apparatus of claim 37, wherein one of the one or more fallback conditions indicates that the apparatus is prohibited from attempting to establish the data context to access the first data service when the apparatus is being supported by a roaming network.

42. The apparatus of claim 37, wherein one of the one or more fallback conditions indicates that the apparatus is prohibited from attempting to establish the data context to access the first data service when a value is set in an application profile associated with the apparatus.

43. The apparatus of claim 37, wherein data service access module is further configured to:
establish a data session with a second data service via a second data system; and
determine whether to reattempt to establish a data context to access the first data service via the first data system based on one or more first data service reconnection triggers.

44. The apparatus of claim 43, wherein one of the first data service reconnection triggers comprises expiration of a retry timer.

45. The apparatus of claim 43, wherein one of the first data service reconnection triggers comprises detection of an event occurrence.

46. The apparatus of claim 45, wherein data service access module is further configured to determine that the data session with the second data service is closed and a new data session is being proposed.

47. The apparatus of claim 45, further comprising moving to long term evolution (LTE) network and wherein the data service access module is further configured to determine that a successful authentication to the LTE network has been performed based on an LTE system attach procedure.

48. The apparatus of claim 47, wherein the data service access module is further configured to use a LTE tunnel to pre-register with the second data service.

49. The apparatus of claim 48, wherein the data service access module is further configured to reattempt to establish a data context to access the first data service over the LTE tunnel.

50. The apparatus of claim 47, wherein the data service access module is further configured to reattempt to establish a data context to access the first data service prior to expiration of a retry timer.

51. The apparatus of claim 47, wherein the data service access module is further configured to:
detect that the apparatus has moved to a location that includes coverage based on a common access network associated with the first data service and the second data service; and
reattempt to establish a data context to access the first data service based on the detection.

52. The apparatus of claim 45, wherein the data service access module is further configured to determine that a power cycle has been completed.

53. The apparatus of claim 43, wherein the second data service is a high rate packet data (HRPD) service.

54. A non-transitory computer-readable medium storing computer executable code for wireless communication, comprising code for:
determining whether one or more fallback conditions are present before or during establishing a data session with a first data service via a first data system; and
prohibiting further attempts to establish a data context to access the first data service via the first data system based on the determination of the presence of at least one of the one or more fallback conditions;
wherein one of the one or more fallback conditions indicates an occurrence of a hard fallback failure or an occurrence of a soft fallback failure;
wherein when the one of the one or more fallback conditions indicates the occurrence of the hard fallback failure, the first data service comprises an evolved high rate packet data (eHRPD) service, and the hard fallback failure comprises an authentication failure; and
wherein when the one or more fallback conditions indicates the occurrence of the soft fallback failure, the first data service comprises the eHRPD service, and the soft fallback failure comprises a link control protocol (LCP) negotiation procedure failure.

* * * * *